US011378979B2

(12) United States Patent
Zhou et al.

(10) Patent No.: US 11,378,979 B2
(45) Date of Patent: Jul. 5, 2022

(54) MOVING OBJECT AND POSITIONING METHOD THEREFOR, AUTOMATED WORKING SYSTEM, AND STORAGE MEDIUM

(71) Applicant: Positec Power Tools (Suzhou) Co., Ltd, Jiangsu (CN)

(72) Inventors: Chang Zhou, Jiangsu (CN); Yiyun Tan, Jiangsu (CN); Yong Shao, Jiangsu (CN); Fangshi Liu, Jiangsu (CN); Mingming He, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 283 days.

(21) Appl. No.: 16/612,596

(22) PCT Filed: May 25, 2018

(86) PCT No.: PCT/CN2018/088518
§ 371 (c)(1),
(2) Date: Nov. 11, 2019

(87) PCT Pub. No.: WO2018/214977
PCT Pub. Date: Nov. 29, 2018

(65) Prior Publication Data
US 2021/0157334 A1 May 27, 2021

(30) Foreign Application Priority Data

May 26, 2017 (CN) .......................... 201710386643.8
Feb. 26, 2018 (CN) .......................... 201810163178.6
Mar. 2, 2018 (CN) .......................... 201810173597.8

(51) Int. Cl.
*G05D 1/02* (2020.01)
*A01D 34/00* (2006.01)
(Continued)

(52) U.S. Cl.
CPC .......... *G05D 1/0278* (2013.01); *A01D 34/008* (2013.01); *G05D 1/0088* (2013.01); *A01D 2101/00* (2013.01); *G05D 2201/0208* (2013.01)

(58) Field of Classification Search
CPC ............... G05D 1/0278; G05D 1/0088; G05D 2201/0208; A01D 34/008; A01D 2101/00
See application file for complete search history.

(56) References Cited

U.S. PATENT DOCUMENTS 5,490,073 A * 2/1996 Kyrtsos ................... G01S 19/41
342/357.24
5,548,516 A * 8/1996 Gudat ..................... G01S 19/46
701/23
(Continued)

FOREIGN PATENT DOCUMENTS

CN 101435861 A 5/2009
EP 0971276 A1 1/2000

OTHER PUBLICATIONS

International Search Report from PCT/CN2018/088518, dated Aug. 17, 2018.

*Primary Examiner* — Calvin Cheung
(74) *Attorney, Agent, or Firm* — Dentons US LLP

(57) ABSTRACT

A method for positioning an autonomous moving device includes steps of: acquiring a current positioning signal of an autonomous moving device during a moving process, and a reference positioning signal of the autonomous moving device before the current positioning signal; resolving the reference positioning signal and the current positioning signal to acquire error data; and processing the error data and position information of the reference positioning signal to acquire current position information of the autonomous moving device.

20 Claims, 30 Drawing Sheets

(51) Int. Cl.
  *G05D 1/00* (2006.01)
  *A01D 101/00* (2006.01)

(56) References Cited

U.S. PATENT DOCUMENTS

| | | | |
|---|---|---|---|
| 5,563,786 A * | 10/1996 | Torii | G01C 21/00 |
| | | | 342/457 |
| 5,938,704 A | 8/1999 | Torii | |
| 6,272,405 B1 * | 8/2001 | Kubota | G01S 19/48 |
| | | | 701/472 |
| 7,266,098 B2 | 9/2007 | Ogino et al. | |
| 2003/0197638 A1 | 10/2003 | Bloebaum et al. | |
| 2016/0363663 A1 | 12/2016 | Mindell et al. | |

\* cited by examiner

MOVING OBJECT AND POSITIONING METHOD THEREFOR, AUTOMATED WORKING SYSTEM, AND STORAGE MEDIUM

BACKGROUND

Technical Field

The present invention relates to a moving object, and in particular, to a method for positioning a moving object, a moving object using the method, an automatic working system, and a storage medium.

Related Art

Along with increasing progress of computer technologies and artificial intelligence technologies, automatic walking devices similar to intelligent robots begin to step into people's life slowly. Companies such as Samsung and Electrolux all have developed full-automatic vacuum cleaners and put the full-automatic vacuum cleaners in market. Such full-automatic vacuum cleaners usually have a small volume, are integrated with an environment sensor, a self-propelled system, a dust suction system, a battery, and a charging system, and can cruise without manual operation indoors by themselves, return to a charging station to be docked and charged when the energy is low, and then continue to cruise to suck dust. In addition, companies such as Husqvarna have developed similar automatic mowers that can automatically mow a lawn of a user and be charged without interference of the user. Such an automatic lawn mowing system does not need to be managed once it has been set up and users can be liberated from boring, time-consuming, and labor-consuming housework such as cleaning and lawn maintenance, so that the automatic lawn mowing system is greatly popular.

A conventional automatic mower is usually applied to a large area of a working area, such as 1000 square meters. A common automatic mower usually needs to be positioned through two systems, that is, a base station and a receiving station. The base station is used to provide the receiving station with observation values of some satellites in real time, and the receiving station computes positioning data by using an RTK technology according to observation values of the receiving station, achieves high precision positioning through differential correction of data, and acquires a position coordinate of the automatic lawn mower. Such a technology can achieve stable and long-term high precision absolute positioning. The base station can be a self-built base station or a shared base station.

SUMMARY

In view of the defect in the prior art, the embodiments of present invention provide a method for positioning an autonomous moving device without using a base station.

A method for positioning a moving object, comprising the following steps:

acquiring a current positioning signal of a moving object during a moving process, and a reference positioning signal of the moving object before the current positioning signal;

resolving the reference positioning signal and the current positioning signal to acquire error data, the reference positioning signal and the current positioning signal that are resolved having a shared satellite signal; and processing the error data and position information of the reference positioning signal to acquire current position information of the moving object.

In one of the embodiments, the reference positioning signal is collected and acquired from a satellite by the moving object directly.

In one of the embodiments, before the step of acquiring a current positioning signal of a moving object during a moving process, and a reference positioning signal of the moving object before the current positioning signal, further comprising steps of:

determining a reference coordinate of a reference point position; and acquiring a positioning signal of the moving object at the reference point position, and using the positioning signal as a first reference positioning signal.

In one of the embodiments, the reference point position is a charging station position or a calibration point having a fixed reference coordinate set in a working area of the moving object.

In one of the embodiments, a method for acquiring a reference positioning signal comprises:

S1: selecting a latest satellite signal that has been acquired before a current positioning signal as a reference positioning signal;

S2: determining whether the selected reference positioning signal satisfies a resolving condition;

S3: if the selected reference positioning signal satisfies the resolving condition, using the reference positioning signal as a reference positioning signal for a subsequent resolving process; if the selected reference positioning signal does not satisfy the resolving condition, selecting a latest satellite signal before the selected reference positioning signal as a reference positioning signal and repeating step S2;

S4: repeating step S3 till a reference positioning signal that satisfies the resolving condition is acquired.

In one of the embodiments, the resolving condition is that a quantity of shared satellites reaches a specified threshold of a quantity of resolved satellites.

In one of the embodiments, the resolving condition is that the quantity of shared satellites reaches the specified threshold of the quantity of resolved satellites, and signal quality of satellite signals reaches a specified signal-to-noise ratio threshold.

In one of the embodiments, the method for positioning a moving object further comprising:

performing error evaluation on the current position information of the moving object acquired through processing; and returning, by the moving object, to a reference point to acquire an initial reference positioning signal again when an error evaluation result satisfies an error condition.

In one of the embodiments, the reference point position is a charging station position or a calibration point having a fixed reference coordinate set in a working area of the moving object.

In one of the embodiments, the error condition is that a working time of the moving object reaches a specified total working time threshold.

In one of the embodiments, the error condition is that a selected reference positioning signal does not satisfy a resolving condition.

In one of the embodiments, the resolving condition is that:
a quantity of shared satellites reaches a specified threshold of a quantity of resolved satellites.

In one of the embodiments, the resolving condition is that:
the quantity of shared satellites reaches the specified threshold of the quantity of resolved satellites, and signal quality of satellite signals reaches a specified signal-to-noise ratio threshold.

In one of the embodiments, a working area of the moving object is provided with a plurality of calibration points, the plurality of calibration points has a known fixed reference coordinate, and when the moving object moves to a position of a calibration point, the moving object uses position information of the calibration point as current position information.

In one of the embodiments, the method for positioning a moving object further comprising:
determining whether signal strength of the satellite signal is less than a predetermined threshold; and
determining position information of the moving object through a positioning sensor in response to the signal strength of the satellite signal being less than the predetermined threshold.

In one of the embodiments, the positioning sensor comprises an inertial navigation unit, a laser radar, or a carrier-free communications device.

In one of the embodiments, the method for positioning a moving object further comprising compensating for the position information, and the compensation method comprises steps of:
determining the position information of the current positioning signal and using the position information as first position information, and determining position information of the reference positioning signal and using the position information as second position information; and
compensating for the first position information of the current positioning signal according to the second position information of the reference positioning signal when the first position information of the current positioning signal satisfies a preset condition.

In one of the embodiments, the preset condition comprises: a first precision value of the current positioning signal is less than a first preset precision threshold.

In one of the embodiments, the preset condition comprises: a difference between the first position information and the second position information is greater than a preset threshold.

In one of the embodiments, a quantity of the reference positioning signals is at least two, and the compensating for the first position information of the current positioning signal according to the second position information of the reference positioning signal comprises:
determining moving track information of the moving object according to second position information of at least two reference positioning signals and using the moving track information as first moving track information; and
compensating for the first position information of the current positioning signal according to the first moving track information.

In one of the embodiments, the compensating for the first position information of the current positioning signal according to the first moving track information comprises:
determining a target position of the current positioning signal according to the first moving track information; and
adjusting a position corresponding to the first position information of the current positioning signal as the target position directly.

In one of the embodiments, the compensation method further comprises:
acquiring a second positioning signal collected after the current positioning signal;
determining a second precision value of the second positioning signal, and determining moving track information between the compensated current positioning signal and the second positioning signal and using the moving track information as second moving track information;
performing smooth filtering on the first moving track information and the second moving track information if the second precision value is greater than or equal to a second preset precision threshold; and
updating the second moving track information according to the first moving track information if the second precision value is less than the second preset precision threshold.

In one of the embodiments, the method for positioning a moving object further comprising determining a direction of the moving object, a method for determining a direction of the moving object comprises steps of:
acquiring, from a first antenna for receiving a satellite signal, first position data of the first antenna, the first antenna being disposed on the moving object;
acquiring, from a second antenna for receiving a satellite signal, second position data of the second antenna, the second antenna being disposed on the moving object, and a predetermined angle existing between a direction of a connecting line of the first antenna and the second antenna and an orientation of the moving object; and
determining the orientation of the moving object according to the first position data, the second position data, and the predetermined angle.

In one of the embodiments, the first antenna is disposed on a front part of a body of the moving object, and the second antenna is disposed on a rear part of the body of the moving object.

In one of the embodiments, the first antenna and the second antenna are both disposed on a central axis of the body of the moving object.

In one of the embodiments, position data of the antenna is acquired by a satellite positioning system and an inertial navigation unit.

In one of the embodiments, the method for determining a direction of the moving object further comprises:
determining an orientation of the moving object through an angular sensor.

In one of the embodiments, the method for determining a direction of the moving object further comprises:
determining whether signal strength of the satellite signal is less than a predetermined threshold; and
determining the orientation of the moving object through the angular sensor in response to the signal strength of the satellite signal being less than the predetermined threshold.

In one of the embodiments, the angular sensor comprises a compass or a gyroscope.

A moving object, comprising:
a first signal acquisition module, configured to acquire a current positioning signal of a moving object during a moving process, and a reference positioning signal of the moving object before the current positioning signal;
a resolving processing module, configured to resolve the reference positioning signal and the current positioning signal to acquire error data, the reference positioning signal and the current positioning signal that are resolved having a shared satellite signal; and a position determining module, configured to determine current position information of the moving object according to the error data and position information of the reference positioning signal.

In one of the embodiments, the reference positioning signal is collected and acquired from a satellite by the moving object directly.

In one of the embodiments, the moving object comprising:

a reference point position determining module, configured to determine a reference coordinate of a reference point position, the first signal acquisition module is configured to: acquire a positioning signal of the moving object at the reference point position, and use the positioning signal as a first reference positioning signal.

In one of the embodiments, the reference point position is a charging station position or a calibration point having a fixed reference coordinate set in a working area of the moving object.

In one of the embodiments, the moving object comprising:

a resolving condition determining module, configured to:
determine whether a selected reference positioning signal satisfies a resolving condition; and
use the selected reference positioning signal as a reference positioning signal for a subsequent resolving process if the reference positioning signal satisfies the resolving condition; select a latest satellite signal before the selected reference positioning signal as a reference positioning signal if the selected reference positioning signal does not satisfy the resolving condition, and repeat determining whether the selected reference positioning signal satisfies the resolving condition, and repeat the step till a reference positioning signal that satisfies the resolving condition is acquired.

In one of the embodiments, the resolving condition is that a quantity of shared satellites reaches a specified threshold of a quantity of resolved satellites.

In one of the embodiments, the resolving condition is that the quantity of shared satellites reaches the specified threshold of the quantity of resolved satellites, and the signal quality of satellite signals reaches a specified signal-to-noise ratio threshold.

In one of the embodiments, the moving object further comprising an error evaluation module, configured to:
perform error evaluation on the current position information of the moving object acquired through processing; and
make the moving object return to a reference point to acquire an initial reference positioning signal again when an error evaluation result satisfies an error condition.

In one of the embodiments, the reference point position is a charging station position or a calibration point having a fixed reference coordinate set in a working area of the moving object.

In one of the embodiments, the error condition is that a working time of the moving object reaches a specified total working time threshold.

In one of the embodiments, the error condition is that a selected reference positioning signal does not satisfy a resolving condition.

In one of the embodiments, the resolving condition is that a quantity of shared satellites reaches a specified threshold of a quantity of resolved satellites.

In one of the embodiments, the resolving condition is that the quantity of shared satellites reaches the specified threshold of the quantity of resolved satellites, and signal quality of satellite signals reaches a specified signal-to-noise ratio threshold.

In one of the embodiments, a working area of the moving object is provided with a plurality of calibration points, the plurality of calibration points has a known fixed reference coordinate, and when the moving object moves to a position of a calibration point, the moving object uses position information of the calibration point as current position information.

In one of the embodiments, the moving object further comprising:

a signal strength determining module, configured to determine whether a signal strength of the satellite signal is less than a predetermined threshold,
the position determining module is configured to determine position information of the moving object through a positioning sensor in response to the signal strength of the satellite signal being less than the predetermined threshold.

In one of the embodiments, the positioning sensor comprises an inertial navigation unit, a laser radar, or a carrier-free communications device.

In one of the embodiments, the moving object further comprising:

a first determining module, configured to determine position information of the current positioning signal and use the position information as first position information, and determine position information of the reference positioning signal and use the position information as second position information; and
a compensation module, configured to compensate for the first position information of the current positioning signal according to the second position information of the reference positioning signal when the first position information of the current positioning signal satisfies a preset condition.

In one of the embodiments, the preset condition comprises: a first precision value of the current positioning signal is less than a first preset precision threshold.

In one of the embodiments, the preset condition comprises: a difference between the first position information and the second position information is greater than a preset threshold.

In one of the embodiments, a quantity of the reference positioning signals is at least two, and the moving object comprises:

a determining sub-module, configured to determine moving track information of the moving object according to second position information of at least two reference positioning signals and use the moving track information as first moving track information; and
a compensation sub-module, configured to compensate for the first position information of the current positioning signal according to the first moving track information.

In one of the embodiments, the compensation sub-module is configured to:
determine a target position of the current positioning signal according to the first moving track information; and
adjust a position corresponding to the first position information of the current positioning signal as the target position directly.

In one of the embodiments, the moving object further comprising:

a second signal acquisition module, configured to acquire a second positioning signal collected after the current positioning signal; and
a second determining module, configured to determine a second precision value of the second positioning signal, and determine moving track information between the compensated current positioning signal and the second positioning signal and use the moving track information as second moving track information, the compensation module is further configured to perform smooth filtering on the first moving track information and the second moving track information when the second precision value is greater than or equal to a second preset precision threshold; and update the second moving track information according to the first moving track information when the second precision value is less than the second preset precision threshold.

In one of the embodiments, the moving object further comprising:

a first position acquisition module, configured to acquire, from a first antenna for receiving a satellite signal, first position data of the first antenna, the first antenna being disposed on the moving object;

a second position acquisition module, configured to acquire, from a second antenna for receiving a satellite signal, second position data of the second antenna, the second antenna being disposed on the moving object, and a predetermined angle existing between a direction of a connecting line of the first antenna and the second antenna and an orientation of the moving object; and a direction determining module, configured to determine the orientation of the moving object according to the first position data, the second position data, and the predetermined angle.

In one of the embodiments, the first antenna is disposed on a front part of a body of the moving object, and the second antenna is disposed on a rear part of the body of the moving object.

In one of the embodiments, the first antenna and the second antenna are both disposed on a central axis of the body of the moving object.

In one of the embodiments, position data of the antenna is acquired by a satellite positioning system and an inertial navigation unit.

In one of the embodiments, the direction determining module is configured to determine the orientation of the moving object through an angular sensor.

In one of the embodiments, the moving object further comprising:

a signal strength determining module, configured to determine whether a signal strength of the satellite signal is less than a predetermined threshold, the direction determining module is configured to determine the orientation of the moving object through the angular sensor in response to the signal strength of the satellite signal being less than a predetermined threshold.

In one of the embodiments, the angular sensor comprises a compass or a gyroscope.

An automatic working system, comprising:

the aforementioned moving object that moves and works in a limited working area.

A computer readable storage medium storing a computer program, when the computer program instruction is executed by a computing apparatus, the computing apparatus can be operated to perform the aforementioned method for positioning a moving object.

A computer program product, when an instruction in the computer program product is executed by a processor, the processor performs a method for positioning a moving object, and the method comprises:

acquiring a current positioning signal of a moving object during a moving process, and a reference positioning signal of the moving object before the current positioning signal;

resolving the reference positioning signal and the current positioning signal to acquire error data; and processing the error data and position information of the reference positioning signal to acquire current position information of the moving object.

An electronic device, comprising:

a memory, configured to store a computer executable instruction; and a processor, configured to execute the computer executable instruction stored in the memory, so as to perform the aforementioned method for positioning a moving object.

Compared with the prior art, in the embodiments of present invention, the reference positioning signal before the current positioning signal is used to acquire the error data and the error data, and the position information of the reference positioning signal are processed to acquire the current position information, and it is unnecessary to use a self-built base station or a shared base station to process a satellite signal received in real time at a current moment to acquire the current position information. Therefore, according to the embodiments of present invention, the self-built base station or the shared base station can be omitted, so as to simplify installation of users and reduce the costs significantly.

A signal compensation method and apparatus during a map generation process, a storage medium, and a computer program product are provided.

Therefore, one objective of the embodiments of present invention is to provide a signal compensation method during a map generation process that can efficiently weaken the impact caused by an obstacle during a map generation process and enhance map generation effects.

Another objective of the embodiments of present invention is to provide a signal compensation apparatus during a map generation process.

Another objective of the embodiments of present invention is to provide a non-transitory computer readable storage medium.

Another objective of the embodiments of present invention is to provide a computer program product.

To achieve the aforementioned objectives, a signal compensation method during a map generation process in an embodiment according to a first aspect of the embodiments of present invention comprises: determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The signal compensation method during a map generation process in the embodiment according to the first aspect of the embodiments of present invention can efficiently weaken the impact caused by an obstacle during a map generation process and enhance map generation effects by determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

In one of the embodiments, the preset condition comprises: a first precision value of the current positioning signal is less than a first preset precision threshold.

In one of the embodiments, the preset condition comprises: a difference between the first position information and the second position information is greater than a preset threshold.

In one of the embodiments, a quantity of the reference positioning signals is at least two, and the compensating for the first position information of the current positioning signal according to the second position information of the reference positioning signal comprises:

determining moving track information of the moving object according to the second position information of at least two reference positioning signals and using the moving track information as first moving track information; and compensating for the first position information of the current positioning signal according to the first moving track information.

In one of the embodiments, the compensating for the first position information of the current positioning signal according to the first moving track information comprises:

determining a target position of the current positioning signal according to the first moving track information; and adjusting a position corresponding to the first position information of the current positioning signal as the target position directly.

In one of the embodiments, the signal compensation method during the map generation process further comprises:

acquiring a second positioning signal collected after the current positioning signal;

determining a second precision value of the second positioning signal, and determining moving track information between the compensated current positioning signal and the second positioning signal and using the moving track information as second moving track information;

performing smooth filtering on the first moving track information and the second moving track information if the second precision value is less than or equal to a second preset precision threshold; and updating the second moving track information according to the first moving track information if the second precision value is less than the second preset precision threshold.

To achieve the aforementioned objective, a signal compensation apparatus during a map generation process in an embodiment according to a second aspect of the embodiments of present invention comprises: a first determining module, configured to determine a current positioning signal during a map generation process for the moving object, and a reference positioning signal collected before the current positioning signal; a second determining module, configured to determine position information of the current positioning signal and use the position information as first position information, and determine position information of the reference positioning signal and use the position information as second position information; and a compensation module, configured to compensate for the first position information of the current positioning signal according to the second position information of the reference positioning signal when the first position information of the current positioning signal satisfies a preset condition.

The signal compensation apparatus during the map generation process in the embodiment according to the second aspect of the embodiments of present invention can efficiently weaken the impact caused by an obstacle during a map generation process and enhance map generation effects by determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

In one of the embodiments, the preset condition comprises: a first precision value of the current positioning signal is less than a first preset precision threshold.

In one of the embodiments, the preset condition comprises: a difference between the first position information and the second position information is greater than a preset threshold.

In one of the embodiments, a quantity of the reference positioning signals is at least two, and the compensation module comprises:

a determining sub-module, configured to determine moving track information of the moving object according to the second position information of at least two reference positioning signals and use the moving track information as first moving track information; and a compensation sub-module, configured to compensate for the first position information of the current positioning signal according to the first moving track information.

In one of the embodiments, the compensation sub-module is configured to:

determine a target position of the current positioning signal according to the first moving track information; and adjust a position corresponding to the first position information of the current positioning signal as the target position directly.

In one of the embodiments, the signal compensation apparatus during the map generation process further comprises:

a second signal acquisition module, configured to acquire a second positioning signal collected after the current positioning signal; and a second determining module, configured to determine a second precision value of the second positioning signal, and determine moving track information between the compensated current positioning signal and the second positioning signal and use the moving track information as second moving track information, the compensation module is further configured to perform smooth filtering on the first moving track information and the second moving track information if the second precision value is greater than or equal to a second preset precision threshold; and update the second moving track information according to the first moving track information if the second precision value is less than the second preset precision threshold.

To achieve the aforementioned objective, a non-transitory computer readable storage medium is provided in an embodiment according to a third aspect of the embodiments of present invention, and when an instruction in the storage medium is executed by a processor of a mobile terminal, the mobile terminal is enabled to perform a signal compensation method during a map generation process. The method comprises: determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The non-transitory computer readable storage medium in the embodiment according to the third aspect of the embodiments of present invention can efficiently weaken the impact caused by an obstacle during a map generation process and enhance map generation effects by determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

To achieve the aforementioned objective, a computer program product is provided in an embodiment according to a fourth aspect of the embodiments of present invention. When an instruction in the computer program product is executed by a processor, a signal compensation method during a map generation process is performed. The method comprises: determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The computer program product in the embodiment according to the fourth aspect of the embodiments of present invention can efficiently weaken the impact caused by an obstacle during a map generation process and enhance map generation effects by determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

A method for determining a direction of an autonomous moving device is provided.

To overcome the defect in the prior art, the embodiments of present invention intends to resolve a problem of determining a direction of an autonomous moving device when the autonomous moving device moves.

A technical solution used by the embodiments of present invention for resolving the problem of the prior art is described as follows.

A method for determining a direction of an autonomous moving device, comprising: acquiring, from a first antenna for receiving a satellite signal, first position data of the first antenna, the first antenna being disposed on the autonomous moving device; acquiring, from a second antenna for receiving a satellite signal, second position data of the second antenna, the second antenna being disposed on the autonomous moving device, and a predetermined angle existing between a direction of a connecting line of the first antenna and the second antenna and a moving direction of the autonomous moving device; and determining the moving direction of the autonomous moving device according to the first position data, the second position data, and the predetermined angle.

In one of the embodiments, the first antenna is disposed on a front part of a body of the autonomous moving device, and the second antenna is disposed on a rear part of the body of the autonomous moving device.

In one of the embodiments, the first antenna and the second antenna are both disposed on a central axis of the body of the autonomous moving device.

In one of the embodiments, position data of the antenna is acquired by a satellite positioning system and an inertial navigation unit.

In one of the embodiments, the moving direction of the autonomous moving device is determined through an angular sensor.

In one of the embodiments, it is determined whether a signal strength of the satellite signal is less than a predetermined threshold; and the moving direction of the autonomous moving device is determined through an angular sensor in response to the signal strength of the satellite signal being less than the predetermined threshold.

In one of the embodiments, the angular sensor comprises a compass or a gyroscope.

An autonomous moving device comprises: a first position acquisition unit, configured to acquire, from a first antenna for receiving a satellite signal, first position data of the first antenna, the first antenna being disposed on the autonomous moving device; a second position acquisition module, configured to acquire, from a second antenna for receiving a satellite signal, second position data of the second antenna, the second antenna being disposed on the autonomous moving device, and a predetermined angle existed between a direction of a connecting line of the first antenna and the second antenna and a moving direction of the autonomous moving device; and a direction determining module, configured to determine the moving direction of the autonomous moving device according to the first position data, the second position data, and the predetermined angle.

In one of the embodiments, the first antenna is disposed on a front part of a body of the autonomous moving device, and the second antenna is disposed on a rear part of the body of the autonomous moving device.

In one of the embodiments, the first antenna and the second antenna are both disposed on a central axis of the body of the autonomous moving device.

In one of the embodiments, position data of the antenna is acquired by a satellite positioning system and an inertial navigation unit.

In one of the embodiments, the direction determining unit is configured to determine the moving direction of the autonomous moving device through the angular sensor.

In one of the embodiments, the autonomous moving device further comprises: a signal strength determining module, configured to determine whether a signal strength of the satellite signal is less than a predetermined threshold. The direction determining unit is configured to determine a moving direction of the autonomous moving device through a positioning sensor in response to the signal strength of the satellite signal being less than the predetermined threshold.

In one of the embodiments, the angular sensor comprises a compass or a gyroscope.

An automatic working system comprises the aforementioned autonomous moving device that moves and works in a working area limited by a map.

An electronic device comprises: a memory, configured to store a computer executable instruction; and a processor, configured to execute the computer executable instruction stored in the memory, so as to perform the aforementioned method for determining a direction of an autonomous moving device.

A computer readable storage medium storing a computer program instruction, when the computer program instruction is executed by a computing apparatus, the computing apparatus can be operated to perform the aforementioned method for determining a direction of an autonomous moving device.

A method for determining a direction of an autonomous moving device, comprising: acquiring, from a first antenna for receiving a satellite signal, position data of the first antenna at a first moment, the first antenna being disposed on the autonomous moving device; acquiring, from the first antenna, another position data of the first antenna at a second moment, the second moment being later than the first moment; and performing direction fitting based on at least the position data acquired at the first moment and the second moment, so as to determine a moving direction of the autonomous moving device.

In one of the embodiments, an acquisition frequency of the position data is 1 Hz to 100 Hz.

In one of the embodiments, the position data of the antenna is acquired by a satellite positioning system and an inertial navigation unit.

In one of the embodiments, the moving direction of the autonomous moving device is determined through the angular sensor.

In one of the embodiments, it is determined whether a signal strength of the satellite signal is less than a predetermined threshold; and the moving direction of the autonomous moving device is determined through the angular sensor in response to the signal strength of the satellite signal being less than the predetermined threshold.

In one of the embodiments, the angular sensor comprises a compass or a gyroscope.

An autonomous moving device, comprising: a position acquisition unit, configured to acquire, from a first antenna for receiving a satellite signal, position data of the first antenna at a first moment, the first antenna being disposed on the autonomous moving device; and further configured to acquire, from the first antenna, another position data of the first antenna at a second moment, the second moment being later than the first moment; and a direction determining unit, configured to perform direction fitting based on at least the position data acquired at the first moment and the second moment, so as to determine a moving direction of the autonomous moving device.

In one of the embodiments, an acquisition frequency of the position data is 1 Hz to 100 Hz.

In one of the embodiments, the position data of the antenna is acquired by a satellite positioning system and an inertial navigation unit.

In one of the embodiments, the direction determining unit is configured to determine the moving direction of the autonomous moving device through the angular sensor.

In one of the embodiments, the autonomous moving device comprises a signal strength determining unit, configured to determine whether a signal strength of the satellite signal is less than a predetermined threshold. The direction determining unit is configured to determine a moving direction of the autonomous moving device through the angular sensor in response to the signal strength of the satellite signal being less than the predetermined threshold.

In one of the embodiments, the angular sensor comprises a compass or a gyroscope.

An automatic working system comprises the aforementioned autonomous moving device that moves and works in a working area limited by a map.

An electronic device comprises: a memory, configured to store a computer executable instruction; and a processor, configured to execute the computer executable instruction stored in the memory, so as to perform the aforementioned method for determining a direction of an autonomous moving device.

A computer readable storage medium stores a computer program instruction, and when the computer program instruction is executed by a computing apparatus, the computing apparatus can be operated to perform the aforementioned method for determining a direction of an autonomous moving device.

Compared with the prior art, the beneficial effects of the embodiments of present invention are as follows: A moving direction of the autonomous moving device is determined by using position data, so that the moving direction of the autonomous moving device can be accurately determined. Furthermore, the moving direction of the autonomous moving device is determined by an output of an angular sensor and the position data, and not only an error of the sensor can be corrected by using the position data, but also continuous navigation can be performed when the satellite signal is weak or the positioning signal has low precision.

BRIEF DESCRIPTION OF THE DRAWINGS

The technical problem resolved by the present invention, the technical solutions, and the beneficial effects that are describe above can be clearly acquired with reference to descriptions of accompanying drawings and by using detailed descriptions of the following preferred specific embodiments that can implement the present invention.

Same numerals and symbols in the accompanying drawings and the specification are used to represent same or equivalent elements.

DETAILED DESCRIPTION

An autonomous moving device is configured to walk and work in a predetermined working area.

Embodiments of the present invention are described in detail below, examples of the embodiments are shown in the accompanying drawings, and same or similar numerals represent same or similar elements or elements with same or similar functions through the full text. The embodiments described with reference to the accompanying drawings are exemplary, are only used to explain the present invention, and cannot be interpreted as limitations to the present invention. On the contrary, the embodiments of the present invention include all changes, modifications, and equivalents that fall within the scope of spirit and meaning of the appended claims.

In the following description of the embodiments, "error data" refers to an error message acquired by analyzing two groups of satellite signals of which a quantity is the same as a quantity of shared satellites, and the error message is used to position a moving object subsequently. "Error evaluation" refers to evaluating accuracy of position information of the moving object during a moving process of the moving object and analyzing accuracy or an error rate of positioning, so as to prevent the moving object from moving in a wrong direction all along.

First Embodiment

Figure 1:
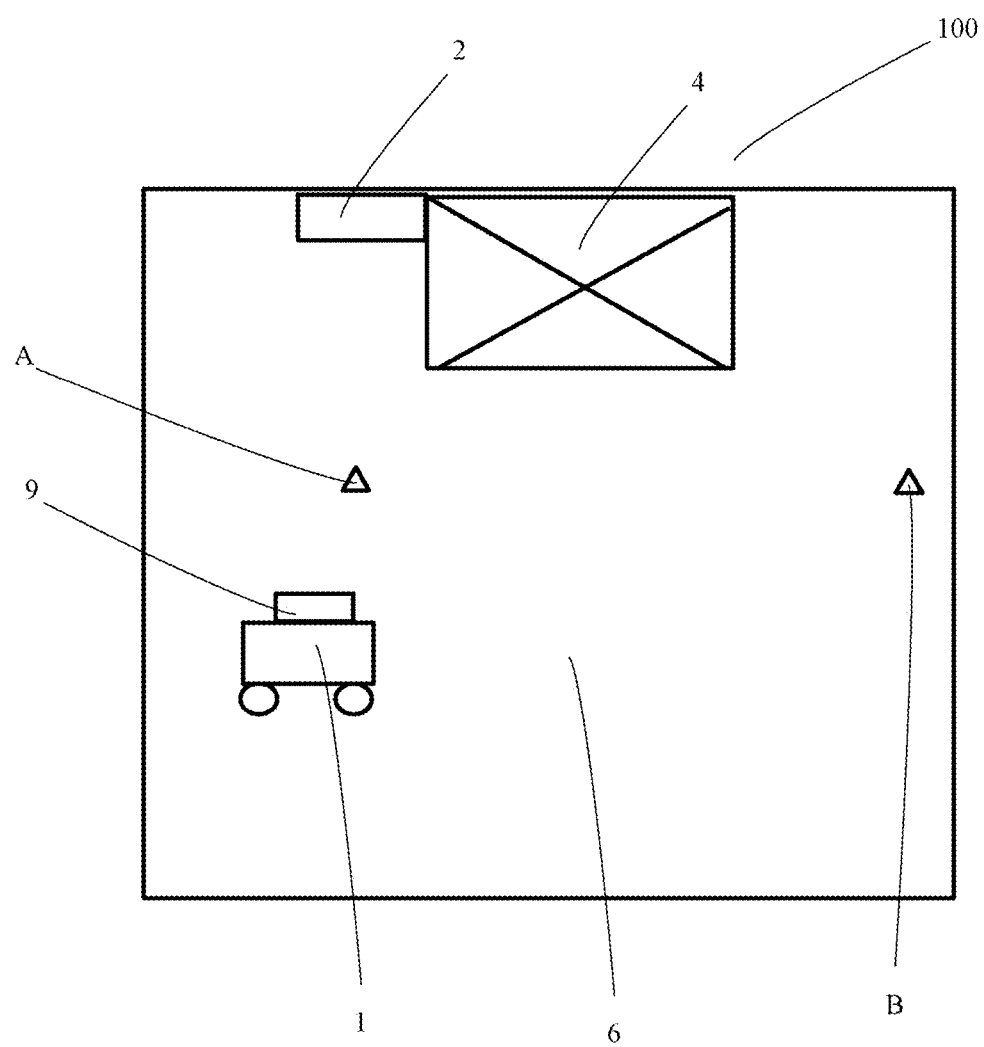
FIG. 1 is a schematic diagram of an automatic working system according to a first embodiment of the present invention.

FIG. 1 is a schematic diagram of an automatic working system 100 according to a first embodiment of the present invention. As shown in FIG. 1, in this embodiment of the present invention, the automatic working system 100 includes an autonomous moving device. The autonomous moving device can move and work in a working area limited by a map. The autonomous moving device is an automatic mower 1 in this embodiment, and can be an unattended device such as an automatic cleaner, an automatic irrigation device, and an automatic snowplow in other embodiments.

Figure 2:
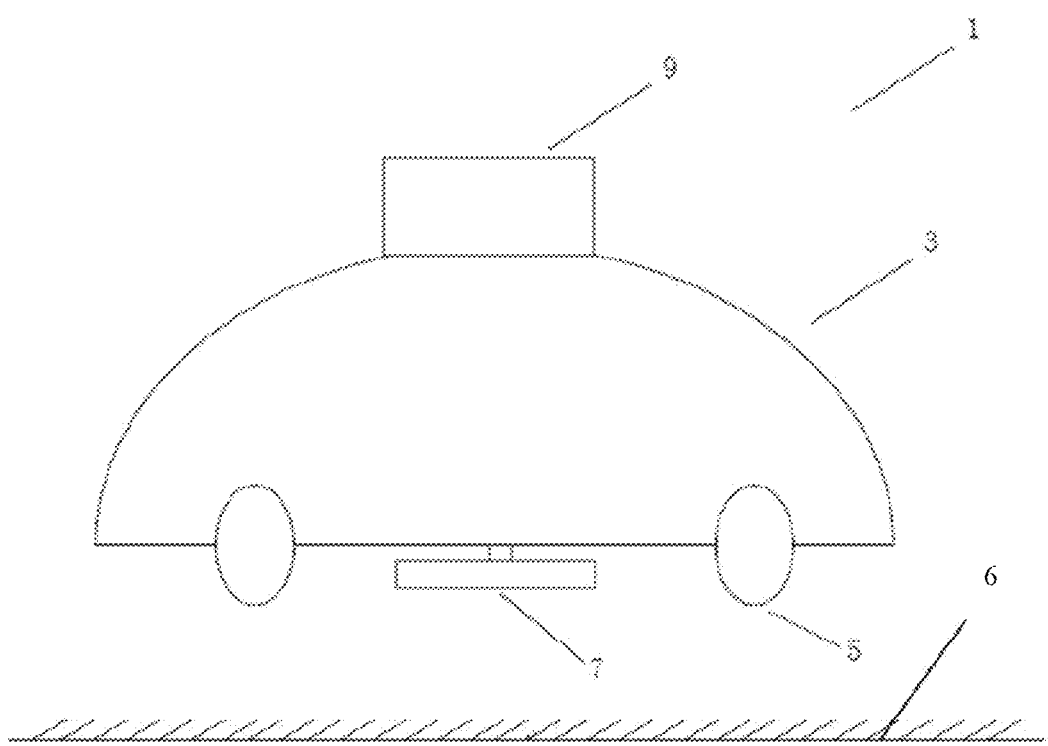
FIG. 2 is a schematic diagram of an autonomous moving device that is an automatic mower and that works in a working area according to an embodiment of the present invention.

As shown in FIG. 2, the automatic mower 1 includes a housing 3, a moving module 5, a task execution module 7, an energy module, a control module, and the like. A working place of the automatic mower 1 is a lawn 6. The moving module 5 includes a caterpillar belt or a wheel set that is driven by a drive motor to drive the automatic mower 1 to move. The task execution module 7 includes a cutting assembly installed on the bottom of the housing 3 and driven by a cutting motor to rotate to mow grass. The energy module includes a battery pack (not shown) that provides electric energy for movement and work of the automatic mower 1. The control module is electrically connected to the moving module 5, the task execution module 7, and the energy module, and controls the moving module to drive the automatic mower 1 to move, and controls the task execution module to execute a working task.

Figure 3:
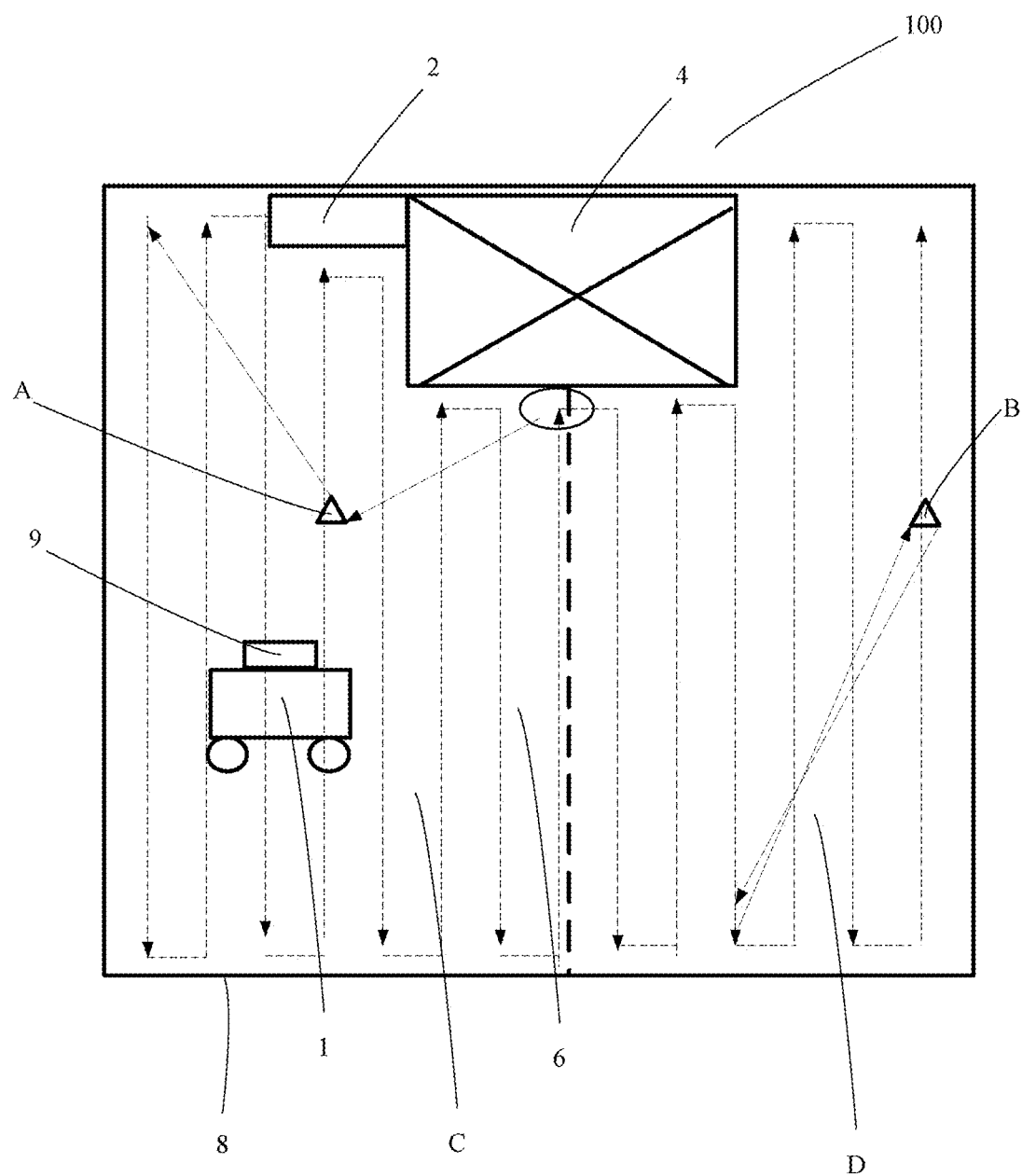
FIG. 3 is a schematic diagram of an automatic working system including two working sub-areas according to an embodiment of the present invention.

As shown in FIG. 3, the automatic working system is configured to work in a predetermined working area. In this embodiment, the working area includes at least two separated working sub-areas, that is, areas C and D. A boundary 8 is formed between the working area and a non-working area, and the working area may possibly have an obstacle such as a tree and a pit.

As shown in FIG. 1, the automatic working system 100 further includes a charging station 2 that is used to supplement electric energy for the automatic mower 1. The charging station 2 can be disposed in an open area beside a house 4. The charging station 2 can further be disposed in the working area or the boundary of the working area. In this embodiment, the automatic working system 100 includes a navigation module configured to output a current position of the automatic lawn mower. In one of the embodiments, the navigation module includes a mobile station 9.

The mobile station 9 is electrically connected to the control module and configured to store and process a satellite signal acquired by the automatic mower 1, so that the automatic mower 1 can move and work in the working area. In this embodiment, the mobile station 9 is configured to receive a satellite signal that includes a satellite angle, a clock, and the like. The satellite signal may be a GPS signal, a Galileo signal, a Beidou signal, or the like, or several signals are used at the same time. In this embodiment, the satellite signal is a differential GPS (DGPS) signal.

Figure 4:
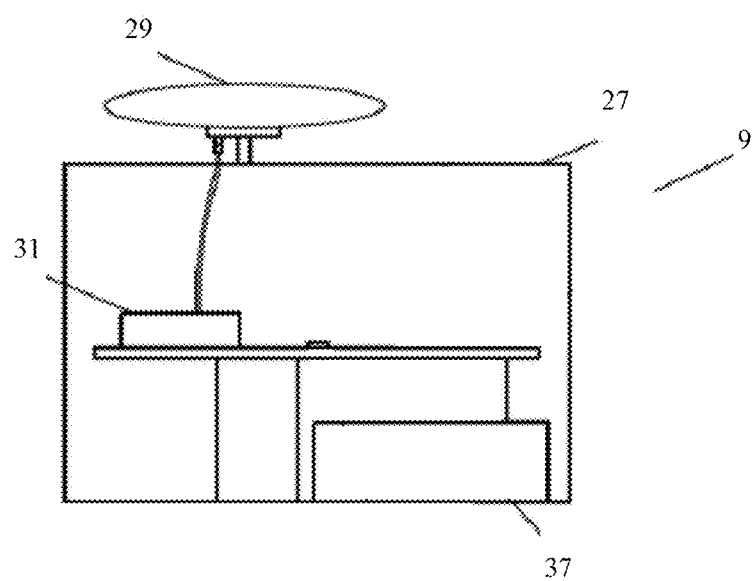
FIG. 4 is a schematic composition diagram of a mobile station according to an embodiment of the present invention.

As shown in FIG. 4, in this embodiment, the mobile station 9 includes a housing 27, a GPS antenna 29 configured to receive a GPS positioning signal, and a GPS board card 31 configured to process the received GPS positioning signal. In this embodiment, the mobile station 9 is integrated with an inertial navigation unit (not shown), and the inertial navigation unit outputs inertial navigation data. When the mobile station 9 is working, only a GPS positioning signal or a positioning signal acquired by merging a GPS positioning signal and inertial navigation data can be used for navigation, or when a GPS signal is weak, only inertial navigation data can also be used for navigation. The mobile station 9 further includes an indicator (not shown) that outputs an indication indicating whether a differential GPS signal at a current position is normal.

In this embodiment, the mobile station 9 is detachably connected to the housing 3 of the automatic mower 1. The mobile station 9 includes a first interface (not shown) connected to the housing of the automatic mower 1. When the automatic mower 1 is working, the mobile station 9 is installed on the housing 3 of the automatic mower 1. When being connected to the housing 3 of the automatic mower 1, the mobile station 9 can be electrically connected to the control module of the automatic mower 1 and outputs a coordinate of a current position of the automatic mower 1, and the control module controls movement and work of the automatic mower 1 according to the current position of the automatic mower 1. Alternatively, the mobile station outputs a control instruction to the control module according to the coordinate of the current position. It should be noted that, in this embodiment of the present invention, the mobile station 9 includes an independent power supply module 37, and can work independently when separated from the housing 3 of the automatic mower 1. In other embodiments, the mobile station 9 may be undetachably connected to the housing 3 of the automatic mower 1, and whether the mobile station 9 is detachably connected to the housing 3 of the automatic mower 1 does not affect positioning of the autonomous moving device during a working process.

The mobile station 9 acquires error data by using a reference positioning signal before a current positioning signal and processes and acquires current position information based on the error data and position information of the reference positioning signal, and it is unnecessary to process a satellite signal received in real time at a current moment by using a self-built base station or a shared base station to acquire the current position information. Therefore, in the present invention, the self-built base station or the shared base station can be omitted, so as to simplify installation of users and reduce the costs significantly.

In this embodiment, an example in which the method for positioning an autonomous moving device without using the self-built base station or the shared base station is configured in an apparatus for positioning an autonomous moving device is used for description.

In this embodiment, the apparatus for positioning an autonomous moving device can be disposed in a server or the mobile station, but the present invention is not limited thereto.

An electronic device is, for example, a personal computer (PC), a cloud device, or a mobile device, and the mobile device is, for example, a smartphone or a tablet computer.

It should be noted that, this embodiment of this application may be executed by, as hardware, for example, a server or a central processing unit (CPU) in the electronic device, and as software, for example, a backend management service in the server or the electronic device, but the present invention is not limited thereto.

Figure 5:
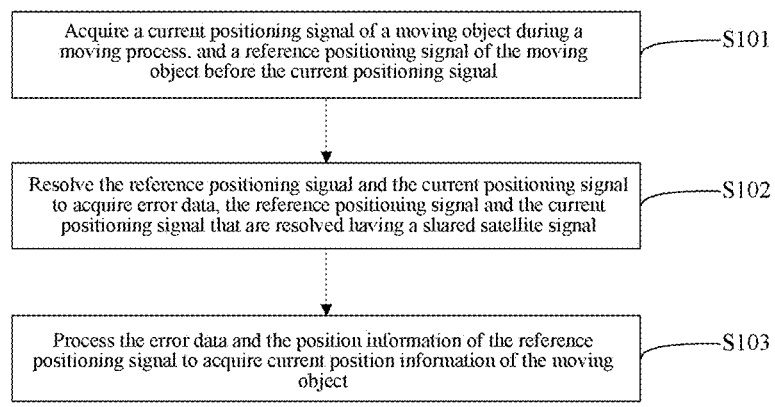
FIG. 5 is a schematic flowchart of a method for positioning an autonomous moving device according to a first embodiment of the present invention.

FIG. 5 is a schematic flowchart of a method for positioning a moving object according to a first embodiment of the present invention. As shown in FIG. 5, the method for positioning a moving object includes the following steps.

S101: Acquire a current positioning signal of a moving object during a moving process, and a reference positioning signal of the moving object before the current positioning signal.

The moving object may be, for example, but is not limited to, the mobile station 9 or an autonomous moving device provided with the mobile station 9.

The current positioning signal can be a current positioning signal of the moving object during a working process, or a current positioning signal during a map generation process. A generated map can serve as a working area of the moving object, which is not limited herein. It can be understood that, the map can be generated in a manner that, for example, a user circles a working area of the moving object on a Google map. The mobile station 9 and the autonomous moving device are integrally formed, and the moving object is the autonomous moving device. The autonomous moving device works for one circle along the working area. For example, if the autonomous moving device is an automatic lawn mower, the user can push the automatic mower to work, the user can remotely control the automatic mower to work, the automatic mower follows a movement track of the user, or the automatic mower works automatically, but the present invention is not limited thereto.

In an embodiment, the mobile station 9 and the automatic mower are disposed separately, and the moving object is a mobile station 9. The mobile station 9 is held by a user to work along the working area for one circle, and a map is generated according to positioning signal data collected during the moving process of the mobile station 9.

The reference positioning signal is acquired by the moving object from a satellite directly, rather than a synchronization satellite signal transmitted by a self-built base station or a shared base station. There may be one or more reference positioning signals.

To acquire an initial first reference positioning signal, before the step of acquiring a current positioning signal of a moving object during a moving process, and a reference positioning signal of the moving object before the current positioning signal, the method further includes steps of: determining a reference coordinate of a reference point position; and acquiring a positioning signal of the moving object at the reference point position, the positioning signal being used as a first reference positioning signal. The reference point position is a charging station position or a calibration point having a fixed reference coordinate set in the working area of the moving object.

For recognition of the reference point position, if the reference point is a charging station, the moving object can be recognized to reach the reference point according to charging and docking, and the reference positioning signal of the reference point position can be acquired. If the reference point is another calibration point, whether the moving object reaches the reference point can be determined by setting a mark signal, for example, a magnetic field or an image.

The moving object is described as an autonomous moving device. When there is one reference positioning signal, the reference positioning signal can be selected to be acquired by acquiring a satellite signal of the reference point at a preset reference point. For the automatic mower 1, the reference point herein is a charging station position or a calibration point having a fixed reference coordinate set in the working area of the autonomous moving device. For another autonomous moving device, if a charging station does not need to be set in the working area or outdoors, a selected calibration point having a fixed reference coordinate or an object or a stopping point having a fixed coordinate can be used as a reference point. In this embodiment of the present invention, using the automatic mower as an example, the charging station or the calibration point having a fixed reference coordinate is used as a virtual base station point. Since the charging station or the calibration point having a fixed reference coordinate can be considered as an unchangeable physical position, the charging station or the calibration point having a fixed reference coordinate is used as a virtual base station point. For the charging station, since the automatic mower 1 starts from the charging station each time and is finally docked with the charging station, the charging station can be considered as an unchangeable physical position, and the charging station is used as a virtual base station point. Each time before the automatic mower 1 works, a satellite signal received by the charging station position at that time is saved in the mobile station 9 as virtual base station data and is used as a reference positioning signal. For a calibration point having a fixed reference coordinate, similarly, when the automatic mower 1 passes through the calibration point, a satellite signal received at the position of the calibration point at that time is saved in the mobile station 9 as virtual base station data and is used as a reference positioning signal.

The moving object is described as an autonomous moving device. When there is a plurality of reference positioning signals, a first reference positioning signal is acquired by acquiring a satellite signal of the reference point at the preset reference point, and other reference positioning signals are acquired by storing satellite signals at specific positions acquired during a moving process of the automatic mower 1, that is, satellite signals are acquired and stored in a moving range before the current position of the automatic mower 1.

When there is a plurality of reference positioning signals, the method for acquiring a reference positioning signal includes: S1: selecting a latest satellite signal that has been acquired before the current positioning signal as the reference positioning signal; S2: determining whether the selected reference positioning signal satisfies a resolving condition; S3: if the selected reference positioning signal satisfies the resolving condition, using the reference positioning signal as a reference positioning signal for a subsequent resolving process; if the selected reference positioning signal does not satisfy the resolving condition, selecting a latest satellite signal before the selected reference positioning signal as the reference positioning signal and repeating step S2; S4: repeating step S3 till a reference positioning signal that satisfies the resolving condition is acquired. The resolving condition is that a quantity of shared satellites reaches a specified threshold of a quantity of resolved satellites. Furthermore, the resolving condition is that the quantity of shared satellites reaches the specified threshold of the quantity of resolved satellites, and signal quality of satellite signals reaches a specified signal-to-noise ratio threshold. As described above, the moving object firstly selects a latest reference positioning signal that satisfies resolving requirements to perform resolving.

In this embodiment, the charging station or the calibration point having a fixed reference coordinate needs to be better disposed in a relatively open environment, so as to receive a better satellite signal. The virtual base station data may be an acquired original satellite signal or a processed satellite signal, and either the original satellite signal or the processed satellite signal has no impact on following signal processing.

The moving object is described as the mobile station 9. When there is one reference positioning signal, the reference positioning signal can be selected to be acquired by acquiring a satellite signal of the reference point at a preset reference point. For the automatic mower 1, the reference point herein is a charging station position or a calibration point having a fixed reference coordinate set in the working area of the autonomous moving device. For another autonomous moving device, if a charging station does not need to be set in the working area or outdoors, a selected calibration point having a fixed reference coordinate or an object or a stopping point having a fixed coordinate can be used as a reference point. In this embodiment of the present invention, the charging station is used as an example, a user starts from the charging station, and a satellite signal received at the charging station position at that time is saved in the mobile station 9 as virtual base station data, and is used as a reference positioning signal. For a calibration point having a fixed reference coordinate, similarly, the user starts from the calibration point, and a satellite signal received at the position of the calibration point at that time is saved in the mobile station 9 as virtual base station data and is used as the reference positioning signal.

The moving object is described as the mobile station 9. When there is a plurality of reference positioning signals, a first reference positioning signal is acquired by acquiring a satellite signal of the reference point at the preset reference point, and other reference positioning signals are acquired by storing satellite signals at specific positions acquired during a moving process of the user holding the mobile station 9, that is, satellite signals are acquired and stored in a moving range before the current position of the mobile station 9.

In a walking process, the user can directly walk to the position of the calibration point and uses a position coordinate of the calibration point as a current position coordinate, so as to enhance positioning precision and further enhance map generation accuracy.

S102: Resolve the reference positioning signal and the current positioning signal to acquire error data, the reference positioning signal and the current positioning signal that are resolved having a shared satellite signal.

When the reference positioning signal and the current positioning signal do not have a shared satellite signal, resolving cannot be performed. If a shared satellite signal still cannot be acquired in a preset condition along with movement of the moving object, the moving object needs to return to the reference point to acquire a new reference positioning signal. If the moving object is an autonomous moving device, the autonomous moving device can return to the reference point position by itself, and if the moving object is the mobile station 9, the user needs to be reminded to return to the reference point, and a manner for reminding the user can be warning, shutdown, or the like. The preset condition can be a preset time for losing the shared satellite or a time during which resolving cannot be performed.

To achieve a better positioning effect, a threshold of the quantity of resolved satellites is preset. When there is only one reference positioning signal, when the quantity of shared satellites reaches the specified threshold of the quantity of resolved satellites, the reference positioning signal and the current positioning signal are resolved. When the quantity of shared satellites does not reach the specified threshold of the quantity of resolved satellites, if a shared satellite signal cannot be acquired in the preset condition along with movement of the moving object, the moving object will return to the reference point to acquire a new reference positioning signal. The quantity of resolved satellites is at least 7 to 8, and fewer satellites cannot be resolved to acquire position information. Certainly, too many satellites are also unsuitable for the satellites which will cause high requirements on a computing capability of a mobile device and increase costs. In an embodiment, the quantity of resolved satellites is 13 to 14, the quantity of satellites in this range satisfies the resolving requirements, and a common mobile device can perform, without high costs, satellite computing by the computing capability supported by hardware and software.

When there is a plurality of reference positioning signals, the reference positioning signal selected to be resolved is a latest satellite signal that is acquired before the current moment, and a reference positioning signal having more shared satellites is firstly selected to resolve. In one of the embodiments, when the quantity of shared satellites between the selected latest reference positioning signal that is acquired before the current moment and the satellite signal at the current moment reaches the specified threshold of the quantity of resolved satellites, the reference positioning signal and the current positioning signal are resolved. On the contrary, if the specified threshold of the quantity of resolved satellites is not reached, another latest satellite signal before the selected reference positioning signal is selected to analyze the quantity of shared satellites till a reference positioning signal that reaches the specified threshold of the quantity of resolved satellites exists, and then the reference positioning signal is resolved. If the moving object still cannot acquire a shared satellite signal in the preset condition, the moving object returns to the reference point to acquire a new reference positioning signal. After the moving object goes out to work, a satellite signal received by the mobile station 9 in real time and a reference positioning signal received by a virtual base station (that is, the charging station or the calibration point having a fixed reference coordinate) are resolved to acquire high-precision positioning data. When the moving object returns to the reference point, the stored satellite signal of the virtual base station is cleaned. When the moving object works next time, a satellite signal of the virtual base station at that time is recorded as the reference positioning signal.

The resolving condition is that the quantity of shared satellites reaches the specified threshold of the quantity of resolved satellites. In addition, besides the requirement on the quantity of satellites, signal quality of a satellite signal also needs to satisfy a requirement. Therefore, furthermore, the resolving condition is that the quantity of shared satellites reaches the specified threshold of the quantity of resolved satellites, and signal quality of satellite signals reaches the specified signal-to-noise ratio threshold.

S103: Process the error data and the position information of the reference positioning signal to acquire current position information of the moving object.

Since the ionosphere and environment change slowly, the positioning precision of the moving object degrades after a long time of working. Therefore, error evaluation needs to be performed on the positioning precision, and the error evaluation can be determined according to information such as a geographical position, a positioning and working time, and a current actual time. Therefore, the method for positioning a moving object further includes: performing error evaluation on the current position information of the moving object acquired through processing; and when an error evaluation result satisfies an error condition, returning, by the moving object, to a reference point to acquire an initial reference positioning signal again. When the moving object returns to the reference point to acquire the initial reference positioning signal again, all non-current current positioning signals that are saved by the moving object are cleaned. The reference point position is a charging station position or a calibration point having a fixed reference coordinate set in the working area of the moving object. The error condition is that a working time of the moving object reaches a specified total working time threshold. The error condition may further be that the selected reference positioning signal does not satisfy the resolving condition, and the resolving condition is that the quantity of shared satellites reaches the specified threshold of the quantity of resolved satellites. Furthermore, the resolving condition is that the quantity of shared satellites reaches the specified threshold of the quantity of resolved satellites, and signal quality of the satellite signals reaches the specified signal-to-noise ratio threshold.

In general, a method for setting an error condition can be set by using the following method. If the moving object is an autonomous moving device, a method for setting an error threshold can be: a value of a time range during which the moving object leaves a reference point, a value of a time range during which the reference positioning signal and the current positioning signal cannot be resolved, a value of a specified working time range, and a value of a time range during which the shared satellite is lost. If the moving object is the mobile station 9, the method for setting an error threshold can be: a value of a time range during which the reference positioning signal and the current positioning signal cannot be resolved, a value of a time range during which the shared satellite is lost, and the like.

To enhance the working efficiency and the positioning accuracy of the moving object, in an embodiment, a plurality of calibration points having a fixed reference coordinate is set in the working area of the moving object, the plurality of calibration points has a known fixed reference coordinate. When the moving object moves to a position of a calibration point, the moving object uses position information of the calibration point as current position information. For example, for calibration points A and B shown in FIG. 3, when the moving object moves to the position of the calibration point, the moving object uses the position information of the calibration point as the current position information. By means of such a setting, a position coordinate of the moving object can be corrected. These marks can be made through RFID or a Hall sensor, and the fixed calibration points are marked manually or automatically, so that the fixed calibration points acquires a fixed reference coordinate (for example, if a coordinate of the charging station is (0, 0), a coordinate of a physical calibration point is (x, y)), and each time when the moving object walks to a physical calibration point, the coordinate of the physical calibration point is directly used as a current coordinate.

In addition, in the method for positioning a moving object in the present invention, a positioning sensor such as an inertial navigation unit, a laser radar, or a carrier-free communications device can be further used to determine a position coordinate of the moving object.

That is, the method for positioning an autonomous moving device further includes: determining position information of the moving object through the positioning sensor.

In one of the embodiments, a signal strength of the satellite signal can be determined first, and when the signal strength is less than a predetermined threshold, that is, when the signal is weak, the position information of the moving object is determined through the positioning sensor.

That is, the method for positioning a moving object further includes: determining whether the signal strength of the satellite signal is less than the predetermined threshold; determining position information of the moving object through the positioning sensor in response to the signal strength of the satellite signal being less than the predetermined threshold.

When a user has a large house, the moving object can construct a working area map, so as to enhance working efficiency by optimizing a partitioning manner. Specific implementation steps are described as follows. The working area is divided into a plurality of sub-areas, and each area has a working mode that, before the moving object works, a satellite signal received at a reference point at that time, such as the charging station position, is saved in the mobile station 9 as virtual base station data. After the moving object goes out to work, all satellite signals received during the working process are saved, all the satellite signals can be computed and used as virtual base station data. A current satellite signal and the virtual base station data (including the satellite signal at the charging station and other satellite signals received and stored before the current moment during the working process) received by the mobile station 9 in real time are resolved, so as to acquire high-precision positioning data. After finishing the work, the moving object returns to the charging station to modify virtual base station data again and then goes to work in next area. When the moving object works in any sub-area, error evaluation can be performed in real time. When an area of a sub-area is still large, a plurality of fixed calibration points can also be set to correct data, so as to acquire higher-precision positioning data.

Figure 6:
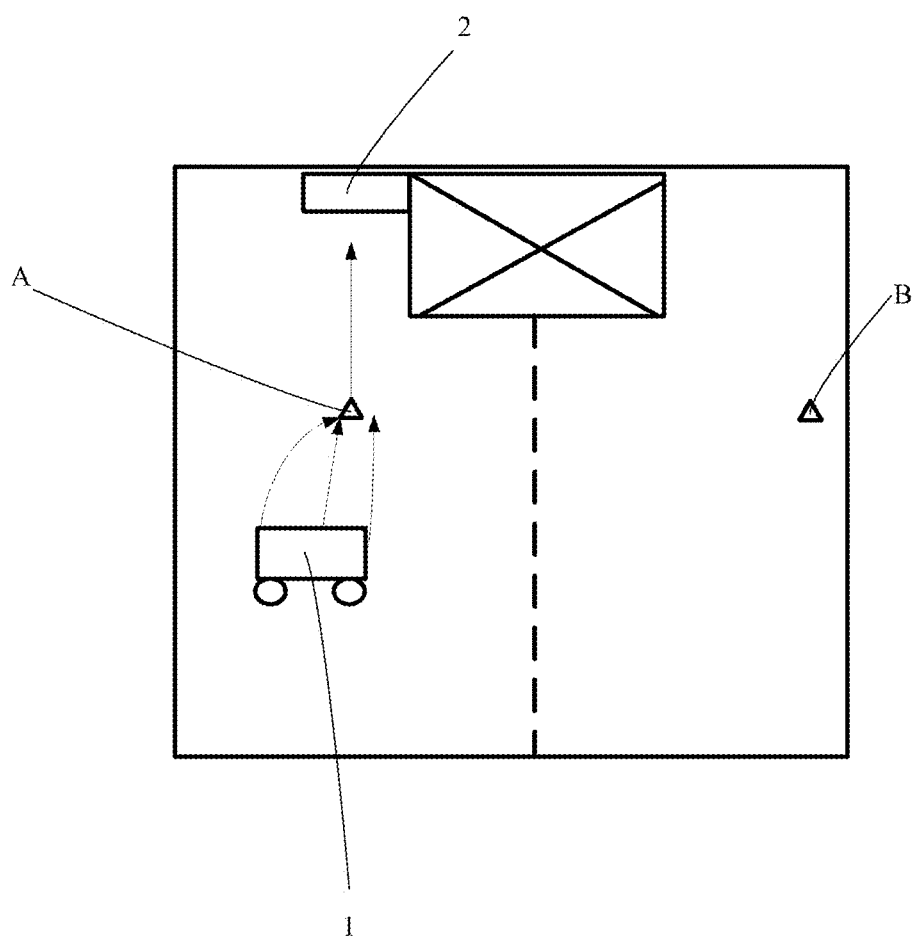
FIG. 6 is a schematic diagram of a returning manner of an autonomous moving device according to an embodiment of the present invention.
Figure 7:
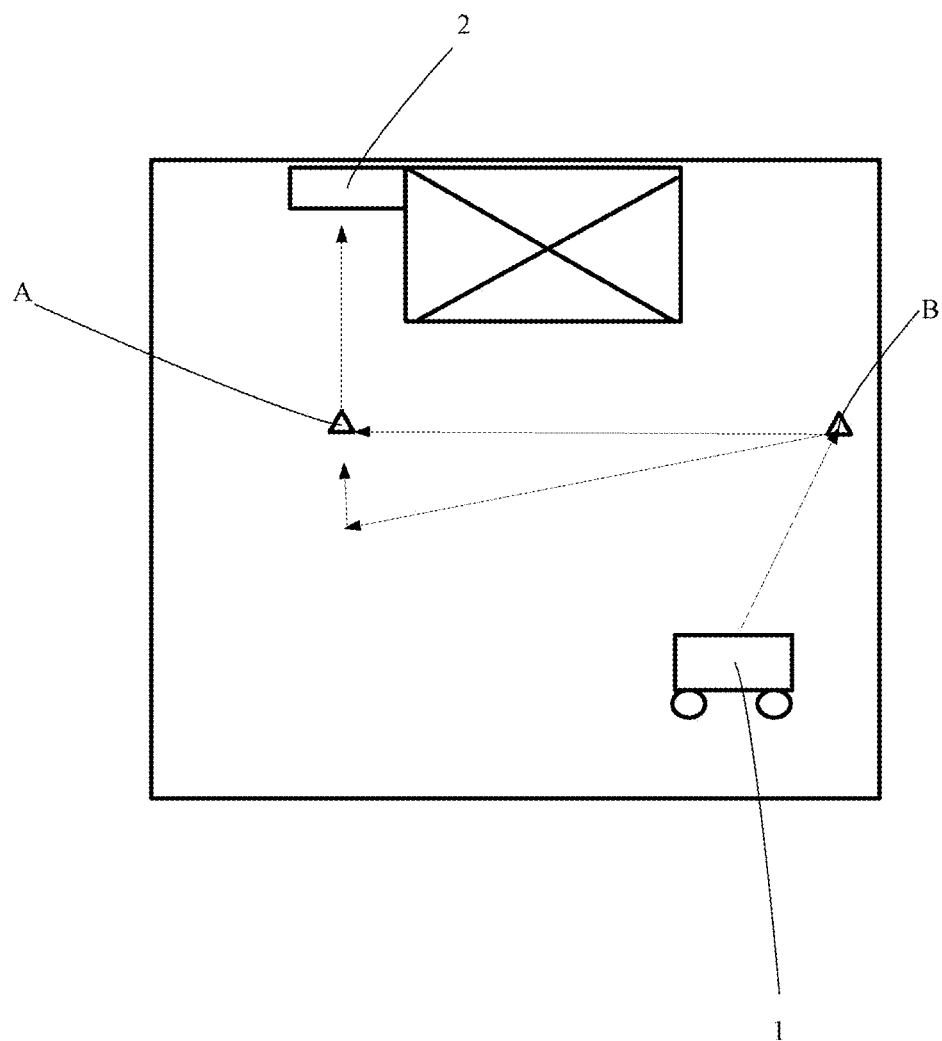
FIG. 7 is a schematic diagram of a returning manner of an autonomous moving device according to an embodiment of the present invention.

If the moving object is an autonomous moving device, the autonomous moving device can return to the charging station in many manners. For example, the moving object can be charged by wired way or wireless way (such as Radio wires). The autonomous moving device returns to be docked with the wires by computing a shortest path. Alternatively, as shown in FIG. 6 and FIG. 7, a calibration point exists in front of the charging station, a machine first returns to the calibration point and then is positioned and docked after being re-corrected. In FIG. 7, the autonomous moving device goes to a nearest calibration point B first, and then moves to a calibration point A from the calibration point B. Two paths are provided for selection and a suitable one can be selected according to requirements for correction and docking.

In this embodiment of the present invention, use of a base station may be omitted, and it is unnecessary to correct and process the current positioning signal by using a satellite signal acquired by a base station in real time. An objective of setting a base station is to provide observation values of some satellites for the mobile station in real time, and the mobile station computes current position information of the moving object by using a differential correction technology according to the observation values of the mobile station. In this embodiment of the present invention, since states of the ionosphere and the environment change slowly in a short time period and an error is considered to be small in a relatively short time period (approximately one hour), the moving object can collect a satellite signal at a reference point with a better signal. At the same time, the reference point is used as a virtual base station, and the satellite signal of the reference point is used to perform differential correction computing as the satellite signal of a short-term virtual base station, so as to acquire high-precision positioning of a receiving station leaving the reference point. At the same time, during a moving process of the moving object, since the moving object stores all satellite signals during the moving process and corresponding position information, the satellite signal before the current moment and the position information corresponding to the satellite signal are used to compute and acquire the position information of the current moment, thereby reducing construction of base stations and communications links and reducing the costs significantly.

In the present invention, the reference positioning signal before the current positioning signal is used to acquire the error data and the error data and the position information of the reference positioning signal are processed to acquire the current position information, and it is unnecessary to process a satellite signal received in real time at the current moment by a self-built base station or a shared base station, so as to acquire the current position information. Therefore, in the present invention, the self-built base station or the shared base station can be omitted, so as to simplify installation of users and reduce the costs significantly.

Figure 8:
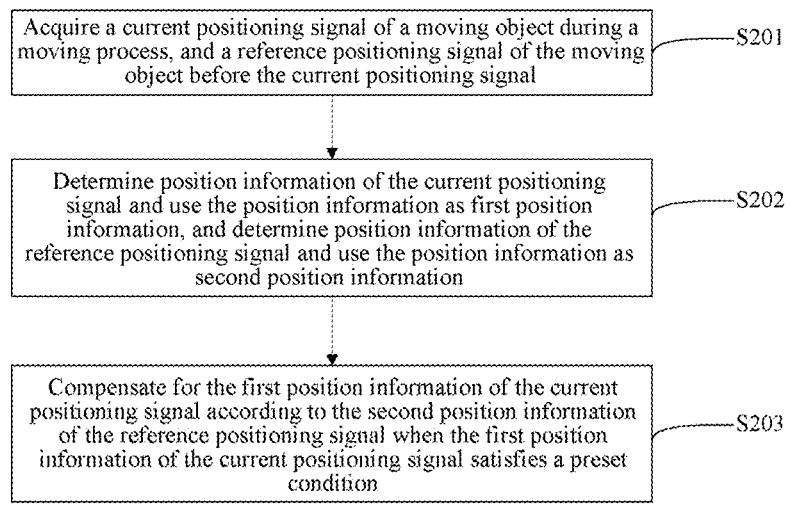
FIG. 8 is a schematic flowchart of a signal compensation method according to an embodiment of the present invention.

As shown in FIG. 8, the method for positioning a moving object in the present invention further includes: compensating for the current position information of the moving object acquired through processing, and the compensation method includes following steps for acquiring.

S201: Acquire a current positioning signal of an autonomous moving device during a moving process, and a reference positioning signal of the autonomous moving device before the current positioning signal.

Figure 9:
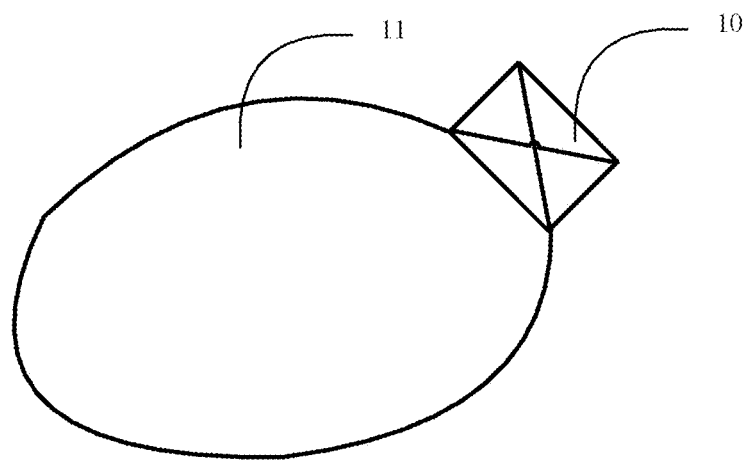
FIG. 9 is a schematic diagram of a signal compensation scenario according to an embodiment of the present invention.
Figure 10:
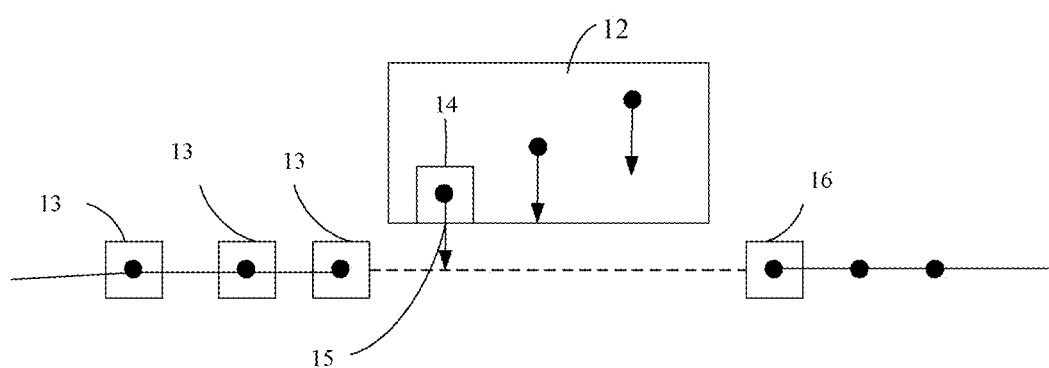
FIG. 10 is a schematic diagram of position information of signal compensation according to an embodiment of the present invention.

During a moving process of the autonomous moving device or an actual map generation process, as shown in FIG. 9, FIG. 9 is a schematic diagram of a signal compensation scenario according to an embodiment of the present invention. An obstacle 10 and a working area 11 are included, and the obstacle 10 may be, for example, a water tower, a bush, or a building. In this scenario, when the working area 11 of the autonomous moving device is adjacent to the obstacle 10, a blocked area cannot receive a signal smoothly, the position information (for example, a position coordinate) of the positioning signal recorded by the mobile station may be shown in FIG. 10. FIG. 10 is a schematic diagram of position information of signal compensation according to an embodiment of the present invention, including a position information module 12 of the area corresponding to the obstacle, and as shown in FIG. 10, the position information of the positioning signal has a large offset. Therefore, this embodiment of the present invention proposes compensating for the signal in this case, thereby efficiently enhancing the positioning effects or map generation effects during a moving process.

During a specific process of implementing this embodiment of this application, first, a current positioning signal during a working process of the moving object or an actual map generation process and a reference positioning signal collected before the current positioning signal are determined, a quantity of reference positioning signals is at least two, and this embodiment can be implemented in real time or at a preset time interval. If this embodiment is implemented in real time, during the working process of the moving object, a current positioning signal during a working process of the moving object is determined in real time, and if this embodiment is implemented at a preset time interval, a current positioning signal during a working process of the moving object is determined at a preset time interval. Alternatively, in a process that the mobile station is held by a user to walk along the working area, a current positioning signal during the map generation process for the moving object is determined in real time, and if this embodiment is implemented at a preset time interval, a current positioning signal during the map generation process for the moving object is determined at the preset time interval, but the present invention is not limited thereto.

As shown in FIG. 10, FIG. 10 further includes three reference positioning signals 13 and a current positioning signal 14. It can be understood that, as time goes on, the current positioning signal 14 is updated continuously till the work of the moving object is finished or the map is generated, and a positioning signal determined and acquired at a current time point can be used as a current positioning signal.

S202: Determine position information of the current positioning signal and use the position information as first position information, and determine position information of the reference positioning signal and use the position information as second position information.

The first position information/second position information can be, for example, a position coordinate, and according to the working principle of the mobile station 9, can be position information of a current positioning signal collected in real time during a working process of the moving object or a process that the mobile station 9 is held by a user to work along the working area. The position information can be referred to as first position information, and the position information of the reference positioning signal is collected and can be referred to as second position information.

In this embodiment of the present invention, position information of the reference positioning signal is determined by determining position information of the reference positioning signal collected before the current positioning signal, and then, signal compensation is performed according to the position information. The implementation and data collection are simple, and an existing device can be used to collect the data, thereby avoiding consuming undue hardware costs.

S203: Compensate for the first position information of the current positioning signal according to the second position information of the reference positioning signal when the first position information of the current positioning signal satisfies a preset condition.

Optionally, the preset condition includes: a first precision value of the current positioning signal is less than a first preset precision threshold or a difference between the first position information and the second position information is greater than a preset threshold. In one of the embodiments, the preset condition is determined to be satisfied according to the first precision value of the current positioning signal being less than the first preset precision threshold and the difference between the first position information and the second position information being greater than the preset threshold.

The first preset precision threshold and the preset threshold can be set by a user according to an actual application demand or can also be preset by a factory program of a signal compensation apparatus during the map generation process, but the present invention is not limited thereto.

During a specific implementation process, this embodiment of the present invention can use a precision measurement algorithm in a related technology to determine a precision value of the current positioning signal, and the precision value can be referred to as a first precision value, but the present invention is not limited thereto.

In this embodiment of the present invention, the first position information of the current positioning signal is compensated according to the second position information of the reference positioning signal only when it is detected that the first position information of the current positioning signal satisfies the preset condition, and otherwise, signal compensation is not triggered, thereby avoiding memory resource consumption caused by unnecessary triggering of signal compensation and enhancing compensation efficiency.

Optionally, moving track information of the moving object can be determined according to the second position information of at least two reference positioning signals and the moving track information is used as first moving track information. The first position information of the current positioning signal is compensated according to the first moving track information.

As shown in FIG. 10, for the three reference positioning signals 13 and the current positioning signal 14, during a signal compensation process, the second position information (that is, the position coordinates) of each of the three reference positioning signals 13 can be determined first, the moving track information of the moving object is determined (the moving track information can be represented by a line connecting the three reference positioning signals 13 in FIG. 10), and the moving track information can be referred to as the first moving track information.

It can be understood that, if it is necessary to perform signal compensation on the current positioning signal 14, it can be assumed that an obstacle exists at the position coordinate of the current positioning signal 14, but no obstacle exists at the position coordinates of the three reference positioning signals 13 collected before the current positioning signal 14. Therefore, signal compensation can be performed on the position information of the current positioning signal 14 with reference to the previous first moving track information, thereby ensuring the reference value of the reference data of signal compensation efficiently and enhancing accuracy of signal compensation.

This embodiment can efficiently weaken the impact caused by the obstacle during the map generation process and enhance map generation effects by determining the current positioning signal during the map generation process for the moving object and the reference positioning signal collected before the current positioning signal; determining the position information of the current positioning signal and using the position information as the first position information, and determining the position information of the reference positioning signal and using the position information as the second position information; and compensating for the first position information of the current positioning signal according to the second position information of the reference positioning signal when the first position information of the current positioning signal satisfies the preset condition.

Figure 11:
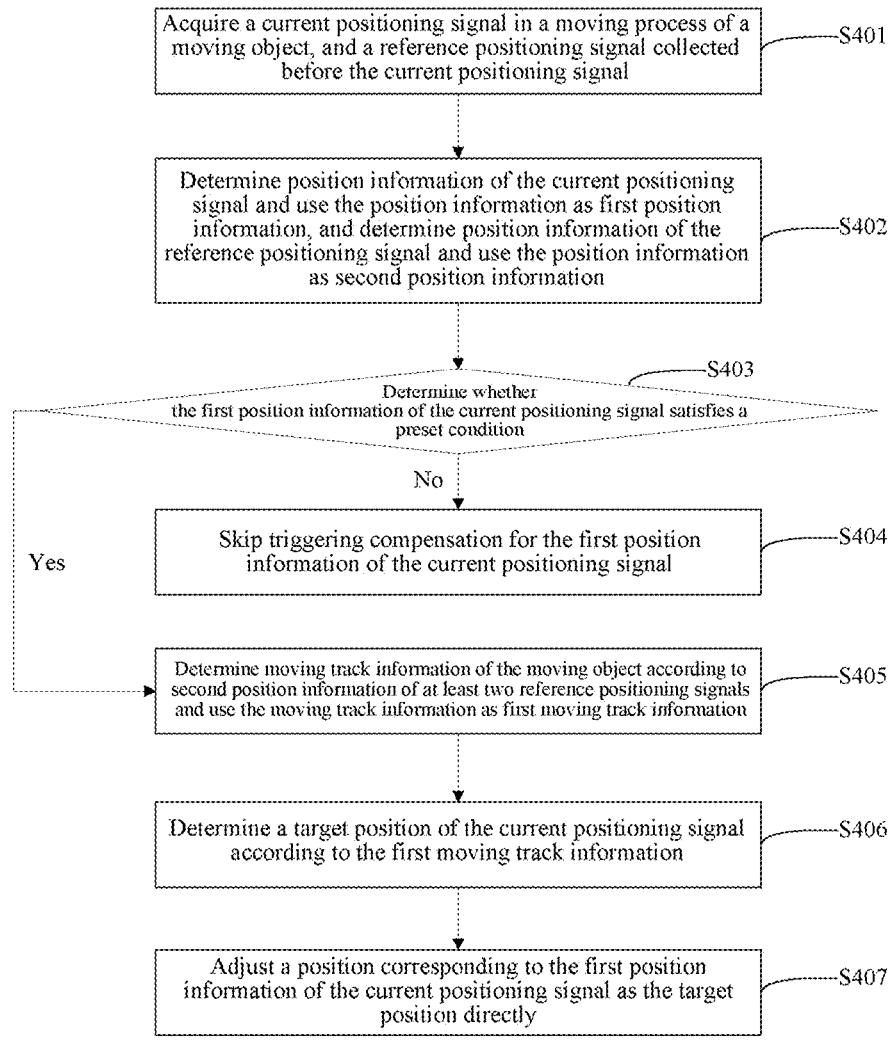
FIG. 11 is a schematic flowchart of a signal compensation method according to another embodiment of the present invention.

FIG. 11 is a schematic flowchart of a signal compensation method according to another embodiment of the present invention.

Referring to FIG. 11, the method includes the following steps.

S401: Acquire a current positioning signal in a moving process of a moving object, and a reference positioning signal collected before the current positioning signal.

During a specific implementation process, this embodiment of the present invention determines a current positioning signal during the moving process of the moving object, the moving process being a working process or a map generation process, and a reference positioning signal collected before the current positioning signal, a quantity of reference positioning signals is at least two, and the implementation of the present invention can be in real time or at a preset time interval.

As shown in FIG. 10, FIG. 10 further includes three reference positioning signals 13 and a current positioning signal 14, arrows 15, and a second positioning signal 16 (the second positioning signal 16 is a positioning signal collected after the current positioning signal 14). It can be understood that, as time goes on, the current positioning signal 14 is updated continuously till the work is finished or the map is generated, and the positioning signal determined at a current time point can be used as a current positioning signal.

S402: Determine position information of the current positioning signal and use the position information as first position information, and determine position information of the reference positioning signal and use the position information as second position information.

The first position information/second position information can be, for example, a position coordinate, and according to the working principle of the mobile station, can be position information of a current positioning signal collected in real time during a working process of the autonomous moving device or a process that the mobile station is held by a user to walk along a working area, the position information can be referred to as first position information, the position information of the reference positioning signal is collected and can be referred to as second position information.

S403: Determine whether the first position information of the current positioning signal satisfies a preset condition, if the first position information of the current positioning signal satisfies the preset condition, perform S405 and the following steps, and otherwise, perform S404.

Optionally, the preset condition includes: a first precision value of the current positioning signal is less than a first preset precision threshold or a difference between the first position information and the second position information is greater than a preset threshold. In one of the embodiments, the preset condition is determined to be satisfied according to the first precision value of the current positioning signal being less than the first preset precision threshold and the difference between the first position information and the second position information being greater than the preset threshold. The first preset precision threshold and the preset threshold can be set by a user according to an actual application demand or can also be preset by a factory program of a signal compensation apparatus during the map generation process, but the present invention is not limited thereto.

S404: Skip triggering compensation for the first position information of the current positioning signal.

S405: Determine moving track information of the moving object according to second position information of at least two reference positioning signals and use the moving track information as first moving track information.

As shown in FIG. 10, for the three reference positioning signals 13 and the current positioning signal 14, the arrow 15, and the second positioning signal 16 (the second positioning signal 16 is a positioning signal collected after the current positioning signal 14), during a signal compensation process, the second position information (that is, the position coordinates) of each of the three reference positioning signals 13 can be determined first, the moving track information of the moving object is determined (the moving track information can be represented by a line connecting the three reference positioning signals 13 in FIG. 10), and the moving track information can be referred to as first moving track information.

It can be understood that, if it is necessary to perform signal compensation on the current positioning signal 14, it can be assumed that an obstacle exists at the position coordinate of the current positioning signal 14, but no obstacle exists at the position coordinates of the three reference positioning signals 13 collected before the current positioning signal 14. Therefore, signal compensation can be performed on the position information of the current positioning signal 14 with reference to the previous first moving track information, thereby ensuring the reference value of the reference data of signal compensation efficiently and enhancing accuracy of signal compensation.

S406: Determine a target position of the current positioning signal according to the first moving track information.

In this embodiment of the present invention, according to the first moving track information, a position where the current positioning signal shall appear along the first moving track information is determined, and the position is used as the target position.

It can be understood that, due to the continuity of boundary data during the moving process of the moving object or the map generation process, position information of a positioning signal at a boundary of the working area is rule-based, and is unlikely to be random position information. Therefore, in this embodiment of the present invention, the target position of the current positioning signal can be determined according to the previous moving track information.

S407: Adjust a position corresponding to the first position information of the current positioning signal as the target position directly.

As shown in FIG. 10, the position corresponding to the position information of the current positioning signal 14 is adjusted to be a target position along a direction of the arrow 15. The target position is located on an extended line (the dashed line in FIG. 10) in the direction of the first moving track as shown in FIG. 10.

In this embodiment of the present invention, the lines and dashed lines in FIG. 10 are not always straight lines, and In one of the embodiments, they can be smooth lines to realize smooth transition of the compensated position signal and reduce a positioning error of the generated map as far as possible.

In this embodiment, signal compensation is performed according to the position information. The implementation and data collection are simple, and an existing device can be used to collect the data, thereby avoiding consuming undue hardware costs. When it is detected that the first position information of the current positioning signal satisfies the preset condition, the first position information of the current positioning signal is compensated according to the second position information of the reference positioning signal, and otherwise, signal compensation is not triggered, thereby avoiding memory resource consumption caused by unnecessary triggering of signal compensation and enhancing compensation efficiency. Signal compensation can be performed on the position information of the current positioning signal with reference to the previous moving track information, thereby ensuring the reference value of the reference data of signal compensation efficiently, weakening the impact caused by the obstacle in the working process of the autonomous moving device or the map generation process efficiently, and enhancing map generation effects.

Figure 12:
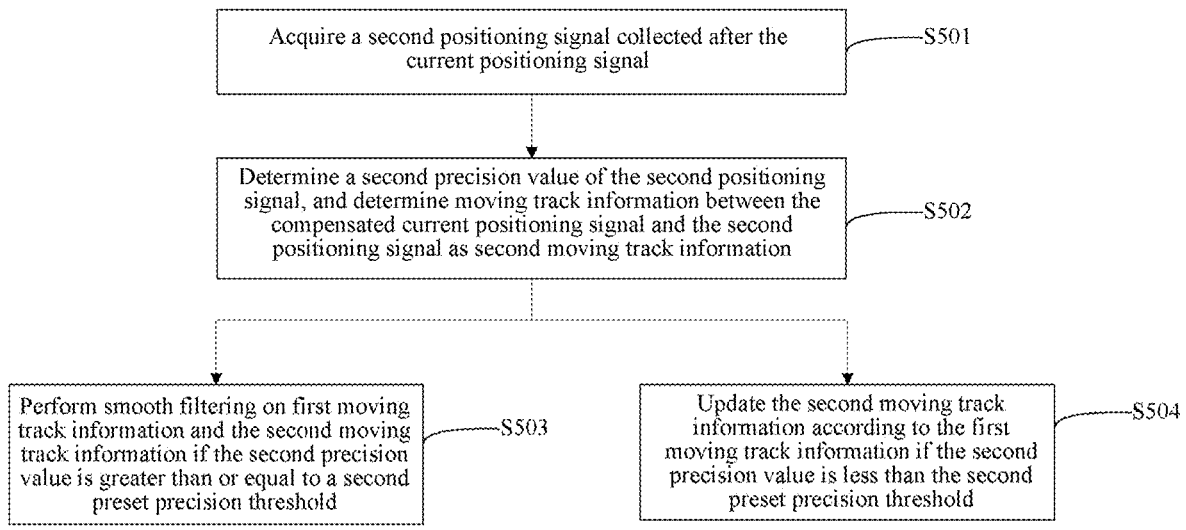
FIG. 12 is a schematic flowchart of a signal compensation method according to another embodiment of the present invention.

FIG. 12 is a schematic flowchart of a signal compensation method during a map generation process according to another embodiment of the present invention.

Referring to FIG. 12, after S203, the method may further include the following steps.

S501: Acquire a second positioning signal collected after the current positioning signal.

Referring to the second positioning signal 16 in FIG. 10, the positioning signal collected after the current positioning signal 14 can be referred to as a second positioning signal. In this embodiment of the present invention, after a plurality of positioning signals at different time points is compensated, all the compensated plurality of positioning signals at different time points can be used as the compensated current positioning signals. Referring to FIG. 10, assuming that three current positioning signals exist at the three corresponding different time points, a positioning signal collected after the three current positioning signals can be used as a second positioning signal.

S502: Determine a second precision value of the second positioning signal, and determine moving track information between the compensated current positioning signal and the second positioning signal as second moving track information.

During a specific implementation process, this embodiment of the present invention can use a precision measurement algorithm in a related technology to determine a precision value of the second positioning signal, and the precision value can be referred to as a second precision value, but the present invention is not limited thereto.

Then, the moving track information between the compensated current positioning signal and the second positioning signal is determined.

S503: Perform smooth filtering on first moving track information and the second moving track information if the second precision value is greater than or equal to a second preset precision threshold.

S504: Update the second moving track information according to the first moving track information if the second precision value is less than the second preset precision threshold.

Figure 13:
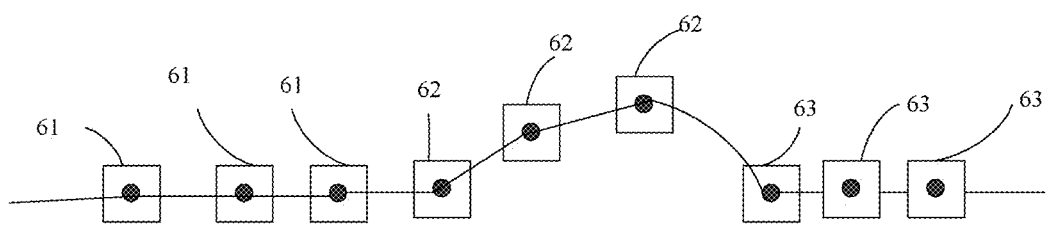
FIG. 13 is a schematic diagram of a moving track after smooth filtering according to an embodiment of the present invention.
Figure 14:
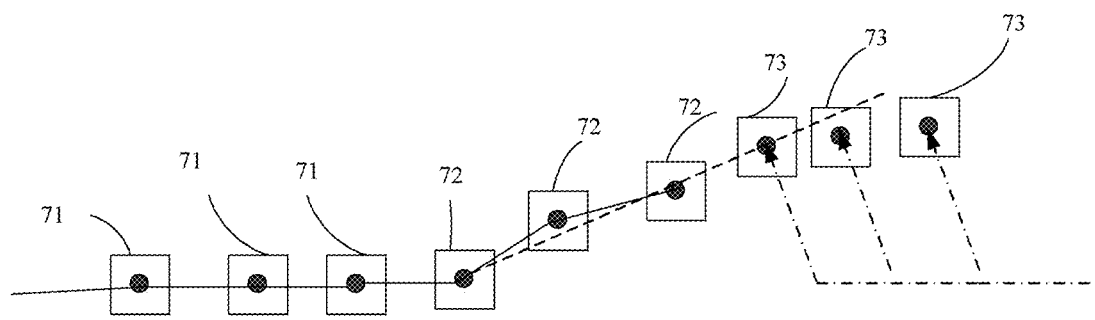
FIG. 14 is a schematic diagram of an updated moving track according to an embodiment of the present invention.

Referring to FIG. 13 and FIG. 14, FIG. 13 is a schematic diagram of a moving track after smooth filtering according to an embodiment of the present invention, and FIG. 14 is a schematic diagram of an updated moving track according to an embodiment of the present invention. FIG. 13 includes three reference positioning signals 61 and compensated positioning signals 62 corresponding to three different time points, and three second positioning signals 63 (the three second positioning signals 63 are positioning signals collected after the compensated positioning signals 62 corresponding to the three different time points). FIG. 14 includes three reference positioning signals 71 and compensated positioning signals 72 corresponding to three different time points, and three second positioning signals 73 (the three second positioning signals 73 are positioning signals collected after the compensated positioning signals 72 corresponding to the three different time points).

The second preset precision threshold can be set by a user according to an actual application demand, or can also be preset by a factory program of a signal compensation apparatus during the map generation process, but the present invention is not limited thereto.

In this embodiment of the present invention, when the second precision value is greater than or equal to the second preset precision threshold, the second positioning signal can be determined as a high-precision signal. In this case, signal compensation cannot be performed on the second positioning signal any longer, and smooth filtering can be performed on the first moving track information and the second moving track information. Referring to FIG. 13, when the second precision value is less than the second preset precision threshold, the second positioning signal is determined as a low-precision signal. In this case, the second moving track information can be updated according to the first moving track information. In one of the embodiments, a positioning signal at a latest time point among the compensated positioning signals corresponding to the three different time points is used as a high-precision signal, and referring to FIG. 14, the following second moving track information of the high-precision signal is offset according to the first moving track information.

During an actual map generation process of the present invention, a positioning signal is usually offset toward the outside of the working area if an obstacle exists. Therefore, the position coordinate of the compensated positioning signal in this embodiment of the present invention is offset towards the inside of the working area, so as to prevent the automatic mower from driving out of the working area. Therefore, this embodiment of the present invention can perform signal compensation according to an actual condition.

Furthermore, regarding map generation in this embodiment of the present invention, in a process of recording a positioning signal, a user can observe a generated map in real time, that is, the generated map can be partially displayed as time goes on and signal compensation is performed in real time.

Furthermore, in this embodiment of the present invention, a reminder module can be further disposed in the mobile station 9, and is configured to remind a user of a quality condition of a current positioning signal, so that the user can adjust a behavior during the map generation process according to the quality condition of the current positioning signal, for example, working toward a direction having a good signal and abandoning an area and a path affected by an obstacle, or the map can also be perfected in a manual editing manner, but the present invention is not limited thereto.

In this embodiment, the second positioning signal collected after the current positioning signal is acquired, the second precision value of the second positioning signal is determined, and the moving track information between the compensated current positioning signal and the second positioning signal is determined and used as the second moving track information. If the second precision value is greater than or equal to the second preset precision threshold, smooth filtering is performed on the first moving track information and the second moving track information, and if the second precision value is less than the second preset precision threshold, the second moving track information is updated according to the first moving track information, so that the compensated position signal can be transited smoothly, thereby reducing the positioning error of the generated map as far as possible.

The method for positioning a moving object further includes determining a direction of the moving object, and in this case, the moving object mainly refers to an autonomous moving device. The method for determining a direction in this embodiment is described by using the autonomous moving device as follows.

During a navigation process of the autonomous moving device, a coordinate and a direction of the autonomous moving device both need to be learned. For example, a steering direction needs to be learned before returning or when a preset path is deviated or a boundary is met.

A conventional method for determining a direction mainly measures a direction by using a sensor directly. For example, a variation of an angle can be acquired by using a gyroscope or the like, so as to determine a direction. However, the problem lies in that errors can be accumulated easily. Alternatively, an angle can be acquired directly by using a compass or the like, but the compass or the like can be easily affected by an environment and has a fixed error.

Based on the aforementioned technical problem, the method for determining a direction of an autonomous moving device according to this embodiment of the present invention determines a direction according to the position information.

Figure 15:
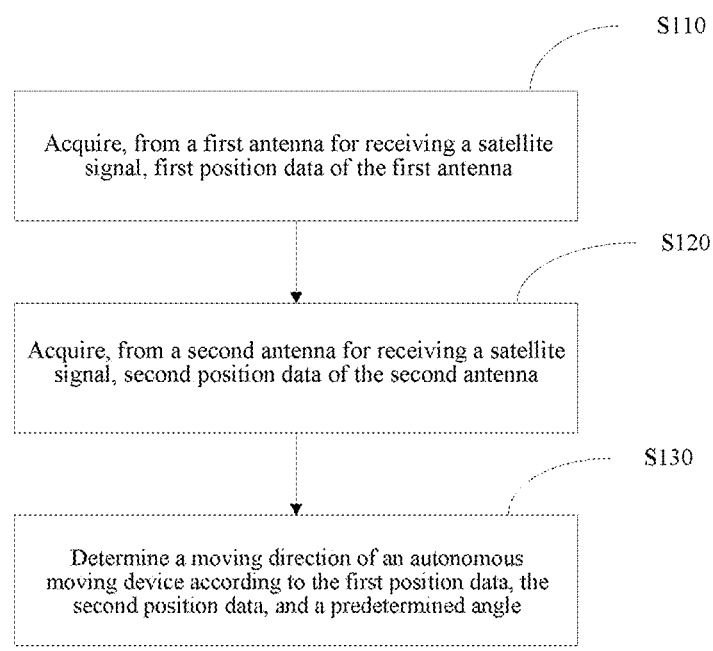
FIG. 15 is a schematic flowchart of a method for determining a direction of an autonomous moving device according to an embodiment of the present invention.

As shown in FIG. 15, FIG. 15 is a schematic flowchart of a method for determining a direction of an autonomous moving device according to an embodiment of the present invention. The method for determining a direction of an autonomous moving device according to this embodiment of the present invention includes: S110: acquiring, from a first antenna for receiving a satellite signal, first position data of the first antenna, the first antenna being disposed on the autonomous moving device; S120: acquiring, from a second antenna for receiving a satellite signal, second position data of the second antenna, the second antenna being disposed on the autonomous moving device, and a predetermined angle existing between a direction of a connecting line of the first antenna and the second antenna and a moving direction of the autonomous moving device; and S130: determining the moving direction of the autonomous moving device according to the first position data, the second position data, and the predetermined angle.

In this embodiment, the autonomous moving device is provided with two antennas. That is, in the method for determining a direction of an autonomous moving device according to this embodiment of the present invention, the moving direction of the autonomous moving device is determined through the positions of the two antennas installed on the autonomous moving device, thereby avoiding the problem of errors caused by the sensor, so as to determine the moving direction of the autonomous moving device accurately.

To determine the moving direction of the autonomous moving device more accurately, the first antenna and In one of the embodiments the second antenna are separated by a distance. That is, in the method for determining a direction of an autonomous moving device according to this embodiment of the present invention, the first antenna is disposed on a front part of a body of the autonomous moving device, and the second antenna is disposed on a rear part of the body of the autonomous moving device. Certainly, if only a distance between the first antenna and the second antenna is enough to determine a direction, the first antenna and the second antenna can also be installed on another position of the autonomous moving device.

In addition, the direction of the connecting line of the first antenna and the second antenna and the moving direction of the autonomous moving device may form a predetermined angle. In this way, if the direction of the connecting line of the first antenna and the second antenna is determined, the moving direction of the autonomous moving device can also be determined based on the predetermined angle. Certainly, the predetermined angle can also be 0 degrees. That is, the direction of the connecting line of the first antenna and the second antenna can be consistent with the moving direction of the autonomous moving device.

In this case, in the method for determining a direction of an autonomous moving device according to this embodiment of the present invention, the first antenna and the second antenna both can be disposed on a central axis of the body of the autonomous moving device.

In this way, the method for determining a direction of an autonomous moving device according to this embodiment of the present invention can output the moving direction of the autonomous moving device in real time.

In the method for determining a direction of an autonomous moving device according to this embodiment of the present invention, position data of the antenna is acquired by a differential satellite positioning system.

In an embodiment, the autonomous moving device acquires the position data of the first antenna and the second antenna through a differential GPS signal.

To assist navigation when the satellite signal is weak, an inertial navigation unit can be further used.

That is, in the method for determining a direction of an autonomous moving device according to this embodiment of the present invention, the position data of the antenna is acquired by the differential satellite positioning system and the inertial navigation unit.

In addition, in the method for determining a direction of an autonomous moving device according to this embodiment of the present invention, an angular sensor, such as a compass and a gyroscope, can be further used to determine the moving direction of the autonomous moving device.

That is, the method for determining a direction of an autonomous moving device further includes determining the moving direction of the autonomous moving device through the angular sensor.

In one of the embodiments, a signal strength of the satellite signal can be determined first, and when the signal strength is less than a predetermined threshold, that is, the signal is weak, the moving direction of the autonomous moving device is determined through the angular sensor.

That is, the method for determining a direction of an autonomous moving device further includes: determining whether the signal strength of the satellite signal is less than the predetermined threshold; and determining the moving direction of the autonomous moving device through the angular sensor in response to the signal strength of the satellite signal being less than the predetermined threshold.

Furthermore, in the method for determining a direction of an autonomous moving device, the angular sensor includes a compass, a gyroscope, or the like.

In an embodiment of the present invention, when the moving direction of the autonomous moving device is determined according to position data, the moving direction of the autonomous moving device can also be determined by fitting position data at different time points.

Figure 16:
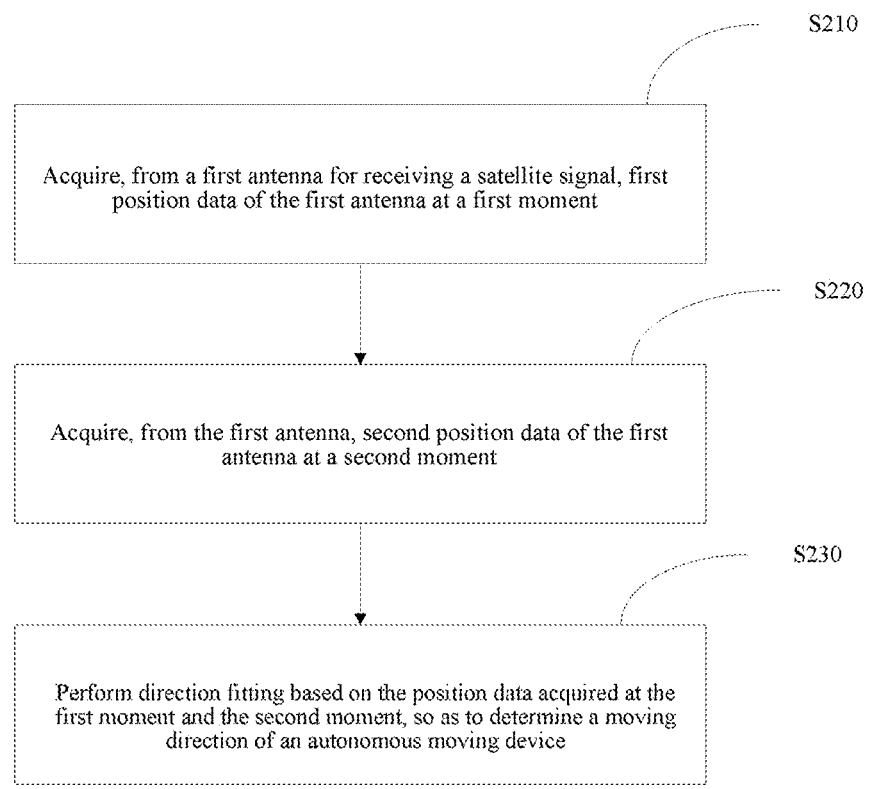
FIG. 16 is a schematic flowchart of a method for determining a direction of an autonomous moving device according to an embodiment of the present invention.

That is, as shown in FIG. 16, the method for determining a direction according to an embodiment of the present invention includes: S210: acquiring, from a first antenna for receiving a satellite signal, first position data of the first antenna at a first moment, the first antenna being disposed on the autonomous moving device; S220: acquiring, from the first antenna, another position data of the first antenna at a second moment, the second moment being later than the first moment; and S230: performing direction fitting based on at least the position data acquired at the first moment and the second moment, so as to determine a moving direction of the autonomous moving device.

In the method for determining a direction of an autonomous moving device according to an embodiment of the present invention, a direction is fitted according to two positions on a time axis (before or after moving).

That is, direction fitting can be performed corresponding to the time axis according to a plurality of pieces of data being at a high precision coordinate for a period of time, so as to determine a moving direction of the autonomous moving device.

In the method for determining a direction of an autonomous moving device, an acquisition frequency of the position data is 1 Hz to 100 Hz.

In the method for determining a direction of an autonomous moving device, the acquisition frequency of the position data is 5 Hz.

In the method for determining a direction of an autonomous moving device, the position data of the antenna is acquired by the differential satellite positioning system and the inertial navigation unit.

In the method for determining a direction of an autonomous moving device, the moving direction of the autonomous moving device is determined through the angular sensor.

The method for determining a direction of an autonomous moving device includes: determining whether the signal strength of the satellite signal is less than the predetermined threshold; and determining the moving direction of the autonomous moving device through the angular sensor in response to the signal strength of the satellite signal being less than the predetermined threshold.

In the method for determining a direction of an autonomous moving device, the angular sensor includes a compass or a gyroscope.

In the method for determining a direction of an autonomous moving device, direction fitting can be performed only according to the position of the autonomous moving device acquired by a single antenna.

The moving direction of the autonomous moving device is determined according to the position data, so as to determine the moving direction of the autonomous moving device accurately. Furthermore, the moving direction of the autonomous moving device is determined through the position data and an output of the angular sensor, so as to not only correct an error of the sensor by using position data, but also continue navigation when the satellite signal is weak or the precision of the positioning signal is low.

Figure 17:
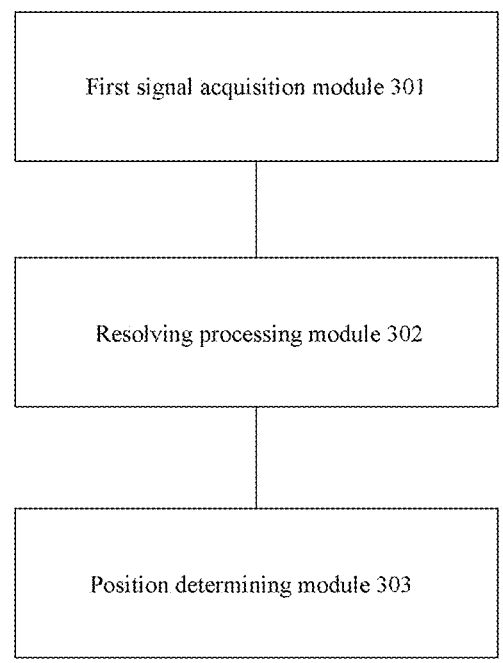
FIG. 17 is a schematic structural diagram of a moving object according to an embodiment of the present invention.

FIG. 17 is a schematic structural diagram of a moving object according to an embodiment of the present invention. As shown in FIG. 17, the moving object includes:

a first signal acquisition module 301, configured to acquire a current positioning signal of the moving object during a moving process, and a reference positioning signal of the moving object before the current positioning signal;

a resolving processing module 302, configured to resolve the reference positioning signal and the current positioning signal to acquire error data, the reference positioning signal and the current positioning signal that are resolved have a shared satellite signal; and a position determining module 303, configured to determine current position information of the moving object according to the error data and position information of the reference positioning signal.

The reference positioning signal is directly collected and acquired from a satellite by the moving object.

The moving object includes: a reference point position determining module, configured to determine a reference coordinate of a reference point position. The first signal acquisition module is configured to acquire a positioning signal of the moving object at the reference point position, and use the positioning signal as a first reference positioning signal. The reference point position is a charging station position or a calibration point having a fixed reference coordinate set in a working area of the moving object.

The moving object includes: a resolving condition determining module, configured to: determine whether a selected reference positioning signal satisfies a resolving condition; if the selected reference positioning signal satisfies the resolving condition, use the reference positioning signal as a reference positioning signal for a subsequent resolving process; if the selected reference positioning signal does not satisfy the resolving condition, select a latest satellite signal before the selected reference positioning signal as the reference positioning signal and repeat determining whether the selected reference positioning signal satisfies a resolving condition and repeat the step till a reference positioning signal that satisfies the resolving condition is acquired. The resolving condition is that a quantity of shared satellites reaches a specified threshold of a quantity of resolved satellites. Furthermore, the resolving condition is that the quantity of shared satellites reaches the specified threshold of the quantity of resolved satellites, and signal quality of satellite signal reaches a specified signal-to-noise ratio threshold.

As described above, it can be learned that, the reference positioning signal and the current positioning signal that are resolved have a shared satellite signal. When the quantity of the shared satellites reaches the specified threshold of the quantity of resolved satellites, the reference positioning signal and the current positioning signal are resolved.

The moving object further includes an error evaluation module, configured to: perform error evaluation on the current position information of the moving object acquired through processing; and return, by the moving object, to a reference point to acquire an initial reference positioning signal again when an error evaluation result satisfies an error condition. The reference point position is a charging station position or a calibration point having a fixed reference coordinate set in a working area of the autonomous moving device. The error condition is that a working time of the moving object reaches a specified total working time threshold. The error condition may further be that the selected reference positioning signal does not satisfy a resolving condition. The resolving condition is that the quantity of shared satellites reaches a specified threshold of the quantity of resolved satellites, and furthermore, the resolving condition is that the quantity of shared satellites reaches the specified threshold of the quantity of resolved satellites, and signal quality of satellite signals reaches a specified signal-to-noise ratio threshold.

The working area of the moving object has a plurality of calibration points, the plurality of calibration points has a known fixed reference coordinate, and when the moving object moves to a calibration point position, the moving object uses position information of the calibration point as current position information When the moving object returns to the reference point to acquire the initial reference positioning signal again, all non-current current positioning signals that are saved by the moving object are cleaned.

The moving object further includes:

a signal strength determining module, configured to determine whether a signal strength of the satellite signal is less than a predetermined threshold, where the position determining module is configured to determine position information of the moving object through a positioning sensor in response to the signal strength of the satellite signal being less than the predetermined threshold. The positioning sensor includes an inertial navigation unit, a laser radar, or a carrier-free communications device.

Figure 18:
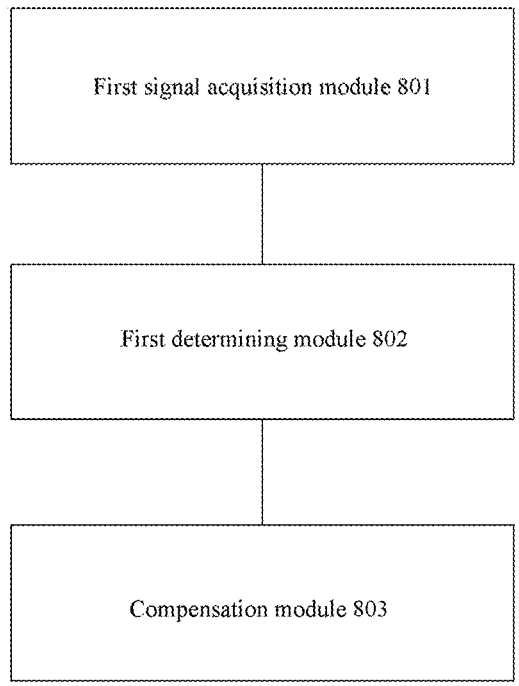
FIG. 18 is a schematic structural diagram of a signal compensation apparatus according to an embodiment of the present invention.

FIG. 18 is a schematic structural diagram of a signal compensation apparatus according to an embodiment of the present invention. As shown in FIG. 18, the signal compensation apparatus 800 includes:

a first signal acquisition module 801, configured to determine a current positioning signal during a map generation process for a moving object and a reference positioning signal collected before the current positioning signal;

a first determining module 802, configured to determine position information of the current positioning signal and use the position information as first position information, and determine position information of the reference positioning signal and use the position information as second position information; and a compensation module 803, configured to compensate for the first position information of the current positioning signal according to the second position information of the reference positioning signal when the first position information of the current positioning signal satisfies a preset condition.

Optionally, the preset condition includes: a first precision value of the current positioning signal is less than a first preset precision threshold; or a difference between the first position information and the second position information is greater than a preset threshold. In one of the embodiments, the preset condition is determined to be satisfied first according to the first precision value of the current positioning signal being less than the first preset precision threshold and the difference between the first position information and the second position information being greater than the preset threshold.

Figure 19:
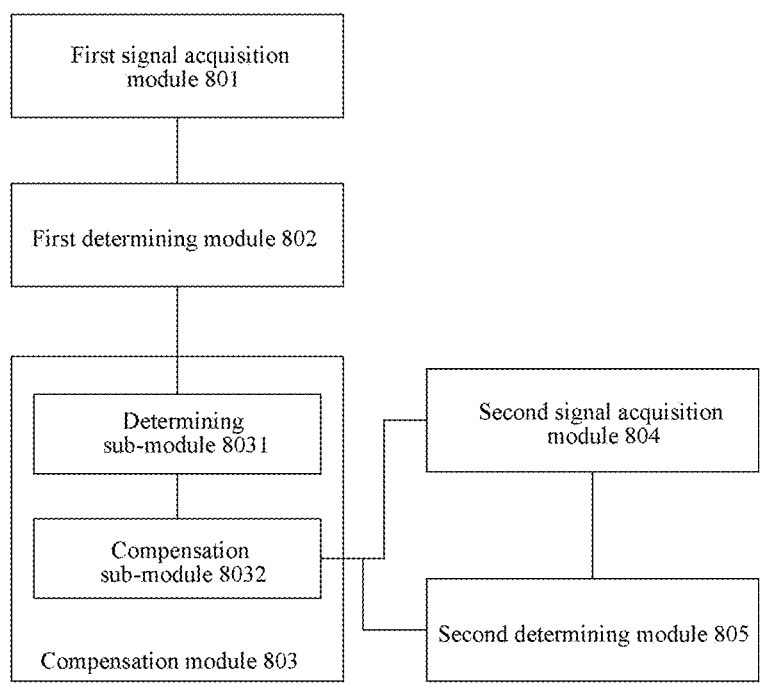
FIG. 19 is a schematic structural diagram of a signal compensation apparatus according to another embodiment of the present invention.

Optionally, in some embodiments, as shown in FIG. 19, a quantity of reference positioning signals is at least two, and the compensation module 803 includes:

a determining sub-module 8031, configured to determine moving track information of the moving object according to second position information of at least two reference positioning signals and use the moving track information as first moving track information.

a compensation sub-module 8032, configured to compensate for the first position information of the current positioning signal according to the first moving track information.

Optionally, in some embodiments, the compensation sub-module 8032 is specifically configured to:

determine a target position of the current positioning signal according to the first moving track information; and adjust a position corresponding to the first position information of the current positioning signal as the target position directly.

Optionally, in some embodiments, as shown in FIG. 19, the signal compensation apparatus 800 further includes:

a second signal acquisition module 804, configured to acquire a second positioning signal collected after the current positioning signal; and a second determining module 805, configured to determine a second precision value of the second positioning signal, and determine moving track information between the compensated current positioning signal and the second positioning signal and use the moving track information as second moving track information.

The compensation module 803 is further configured to perform smooth filtering on the first moving track information and the second moving track information when the second precision value is greater than or equal to a second preset precision threshold, and update the second moving track information according to the first moving track information when the second precision value is less than the second preset precision threshold.

It should be noted that, the explanation and illustration about the signal compensation method in the embodiments shown in FIG. 8 to FIG. 14 are also applicable to the signal compensation apparatus 800 in this embodiment, and the implementation principles thereof are similar and are not repeated herein.

This embodiment can efficiently weaken the impact caused by an obstacle during a working process or a map generation process of the moving object and enhance map generation effects by determining a current positioning signal during a working process of the moving object or the map generation process for the moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

Figure 20:
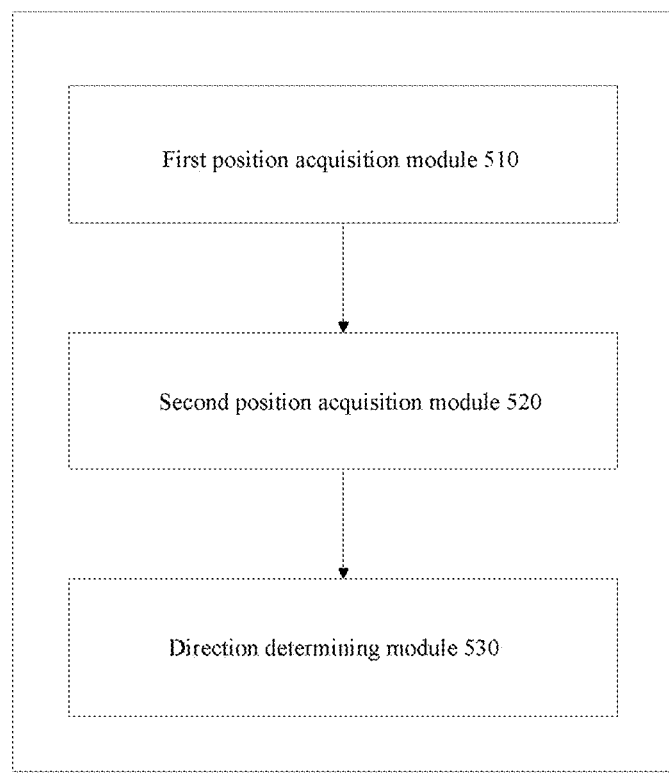
FIG. 20 is a schematic block diagram of an autonomous moving device according to an embodiment of the present invention.

When the moving object is an autonomous moving device, FIG. 20 is a schematic block diagram of an autonomous moving device according to an embodiment of the present invention. As shown in FIG. 20, the autonomous moving device according to this embodiment of the present invention includes: a first position acquisition module 510, configured to acquire, from a first antenna for receiving a satellite signal, first position data of the first antenna, the first antenna being disposed on the autonomous moving device; a second position acquisition module 520, configured to acquire, from a second antenna for receiving a satellite signal, second position data of the second antenna, the second antenna being disposed on the autonomous moving device, and a predetermined angle existing between a direction of a connecting line of the first antenna and the second antenna and a moving direction of the autonomous moving device; and a direction determining module 530, configured to determine a moving direction of the autonomous moving device according to the first position data, the second position data, and the predetermined angle.

In an example, in the autonomous moving device, the first antenna is disposed on a front part of a body of the autonomous moving device, and the second antenna is disposed on a rear part of the body of the autonomous moving device.

In an example, in the autonomous moving device, the first antenna and the second antenna are both disposed on a central axis of the body of the autonomous moving device.

In an example, in the autonomous moving device, the position data of the antenna is acquired by a differential satellite positioning system.

In an example, in the autonomous moving device, the position data of the antenna is acquired by the differential satellite positioning system and an inertial navigation unit.

In an example, in the autonomous moving device, the direction determining unit is configured to determine the moving direction of the autonomous moving device through an angular sensor.

In an example, the autonomous moving device further includes a signal strength determining module, configured to determine whether a signal strength of the satellite signal is less than a predetermined threshold, where the direction determining unit is configured to determine the moving direction of the autonomous moving device through the angular sensor in response to the signal strength of the satellite signal being less than the predetermined threshold.

In an example, in the autonomous moving device, the angular sensor includes a compass or a gyroscope.

The moving direction of the autonomous moving device is determined according to the position data, so as to determine the moving direction of the autonomous moving device accurately. Furthermore, the moving direction of the autonomous moving device is determined through the position data and an output of the angular sensor, so as to not only correct an error of the sensor by using position data, but also continue navigation when the satellite signal is weak or the precision of the positioning signal is low.

Herein, a person skilled in the art can understand that, other details of each module in the autonomous moving device in this embodiment are identical with the corresponding details of the method for determining a direction of an autonomous moving device in an embodiment of the present invention, and will not be repeated herein to avoid redundancies.

Likewise, in another aspect, the autonomous moving device according to an embodiment of the present invention includes: a position acquisition module, configured to acquire, from a first antenna for receiving a satellite signal, first position data of the first antenna at a first moment, the first antenna being disposed on the autonomous moving device, where the position acquisition module is further configured to acquire, from the first antenna, another position data of the first antenna at a second moment, the second moment being later than the first moment; and a direction determining module, configured to perform direction fitting based on at least the position data acquired at the first moment and the second moment, so as to determine a moving direction of the autonomous moving device.

In the autonomous moving device, the acquisition frequency of the position data is 1 Hz to 100 Hz.

In the autonomous moving device, the acquisition frequency of the position data is 5 Hz.

In the autonomous moving device, the position data of the antenna is acquired by the satellite positioning system and the inertial navigation unit.

In the autonomous moving device, the direction determining unit is configured to determine a moving direction of the autonomous moving device through the angular sensor.

The autonomous moving device includes a signal strength determining unit, configured to determine whether a signal strength of a satellite signal is less than a predetermined threshold, where the direction determining unit is configured to determine the moving direction of the autonomous moving device through the angular sensor in response to the signal strength of the satellite signal being less than the predetermined threshold.

In the autonomous moving device, the angular sensor includes a compass or a gyroscope.

To implement the aforementioned embodiment, the present invention further provides an automatic working system that includes the moving object or the autonomous moving device as described above, and moves and works in a working area limited by a map.

In the automatic working system, the autonomous moving device is an automatic lawn mower.

In the automatic working system, the automatic working system is an automatic lawn mower.

To implement the aforementioned embodiment, the present invention further provides a computer readable storage medium, and when a computer program instruction is executed by a computing apparatus, the computing apparatus can be operated to perform a method for positioning an autonomous moving device, and the method includes:

acquiring a current positioning signal of a moving object during a moving process, and a reference positioning signal of the moving object before the current positioning signal;

resolving the reference positioning signal and the current positioning signal to acquire error data; and processing the error data and position information of the reference positioning signal to acquire current position information of the moving object.

When an instruction in the computer readable storage medium is executed by a processor at a terminal, the terminal is enabled to perform a signal compensation method, and the method includes:

acquiring a current positioning signal of a moving object during a moving process, and a reference positioning signal of the moving object before the current positioning signal;

determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The computer readable storage medium in this embodiment can efficiently weaken the impact caused by an obstacle during a moving process or a map generation process of the moving object and enhance map generation effects by determining a current positioning signal during a working process of the moving object or the map generation process for the moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The computer readable storage medium stores a computer program instruction, when the computer program instruction is executed by the processor, the processor is enabled to perform the steps of all the methods of "the method for positioning a moving object", "a signal compensation method", and "a method for determining a direction" according to various embodiment of the present invention described in the parts "the method for positioning a moving object", "a signal compensation method", and "a method for determining a direction" described in the specification.

The computer readable storage medium can use any combination of one or more readable mediums. A readable medium can be a readable signal medium or a readable storage medium. The readable storage medium includes, for example, but is not limited to, electricity, magnet, light, electromagnetism, infrared ray, a system, a device or a unit of a semiconductor, or any combination thereof. More specific examples of the readable storage medium (a non-exhaustive list) include: electric connection with one or more wires, a portable disc, a hard disk, a random access memory (RAM), a read-only memory (ROM), a erasable programmable read-only memory (EPROM or flash memory), an optical fiber, a portable compact disk read-only memory (CD-ROM), an optical storage unit, a magnetic storage unit, or any suitable combination thereof.

To implement the aforementioned embodiment, the present invention further provides a computer program product. When an instruction in the computer program product is executed by a processor, the processor performs a method for positioning a moving object, and the method includes:

acquiring a current positioning signal of a moving object during a moving process, and a reference positioning signal of the moving object before the current positioning signal;

resolving the reference positioning signal and the current positioning signal to acquire error data; and processing the error data and position information of the reference positioning signal to acquire current position information of the moving object.

When an instruction in the computer program product is executed by the processor, the processor performs a signal compensation method, and the method includes:

acquiring a current positioning signal of a moving object during a moving process, and a reference positioning signal of the moving object before the current positioning signal;

determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The computer program product in this embodiment can efficiently weaken the impact caused by an obstacle during a map generation process and enhance map generation effects by determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The computer program product includes a computer program instruction, when the computer program instruction is executed by the processor, the processor performs the steps of all the methods of "the method for positioning a moving object", "a signal compensation method", and "a method for determining a direction" according to various embodiment of the present invention described in the parts "the method for positioning a moving object", "a signal compensation method", and "a method for determining a direction" described in the specification.

The computer program product can edit program code for performing operations in this embodiment of this application by using any combination of one or more programming languages. The programming languages include object-oriented programming languages such as Java and C++, and further include common procedural programming languages, for example, "C" language or a similar programming language. The program code can be executed on a computing device of a user completely, executed on user equipment partially, executed as an independent software package, executed partially on a computing device of a user and partially on a remote computing device, or executed on a remote computing device or a server completely.

To implement the aforementioned embodiment, the present invention further provides an electronic device, including:

a memory, configured to store a computer executable instruction; and a processor, configured to execute a computer executable instruction stored in the memory, so as to perform the method for positioning an autonomous moving device, and the method includes:

acquiring a current positioning signal of a moving object during a moving process, and a reference positioning signal of the moving object before the current positioning signal;

resolving the reference positioning signal and the current positioning signal to acquire error data; and processing the error data and position information of the reference positioning signal to acquire current position information of the moving object.

Regarding the electronic device, the processor is configured to execute a computer executable instruction stored in the memory, so as to perform the signal compensation method, and the signal compensation method includes:

acquiring a current positioning signal of a moving object during a moving process, and a reference positioning signal of the moving object before the current positioning signal;

determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The electronic device may be an electronic device integrated in the mobile station of the autonomous moving device, or a stand-alone device independent of the mobile station. The stand-alone device can communicate with the mobile station, so as to implement a method for determining a direction of an autonomous moving device according to an embodiment of the present invention.

Figure 21:
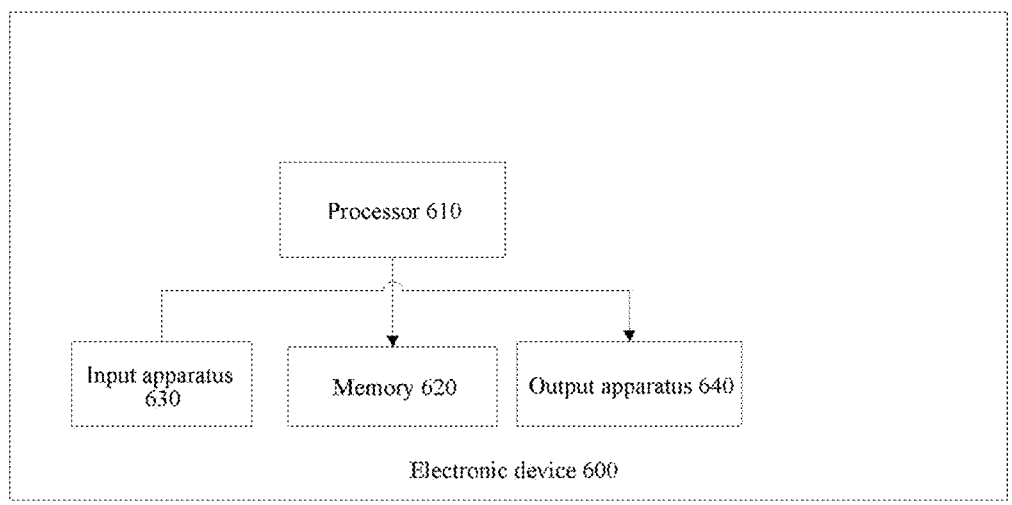
FIG. 21 is a schematic block diagram of an electronic device according to an embodiment of the present invention.

FIG. 21 is a schematic block diagram of an electronic device according to an embodiment of the present invention.

As shown in FIG. 21, the electronic device 600 includes one or more processors 610 and a memory 620.

The processor 610 may be a central processing unit (CPU) or another form of processing unit with a data processing capability and/or instruction execution capability, and can control other assemblies in the electronic device 600 to perform expected functions.

The memory 620 can include one or more computer program products. The computer program product can include various forms of computer readable storage mediums, for example, a volatile memory and/or a non-volatile memory. The volatile memory may include, for example, a random access memory (RAM) and/or a cache. The non-volatile memory can include, for example, a read-only memory (ROM), a hard disk, and a flash memory. The computer readable storage medium can store one or more computer program instructions, and the processor 610 can execute the program instruction, so as to implement a method for positioning an autonomous moving device, a fault warning method, and/or other expected functions in each embodiment of the present invention. The computer readable storage medium can further store content such as position data of the antenna and an installation position of the antenna relative to the autonomous moving device.

In an example, the electronic device 600 may further include an input apparatus 630 and an output apparatus 640, and these assemblies are interconnected through a bus system and/or another form of connection mechanism (not shown).

For example, the input apparatus 630 can be configured to receive an input of a user.

The output device 640 can directly output various types of information to the outside or control the mobile station to send a signal.

Certainly, for simplification, FIG. 21 shows only some of the assemblies in the electronic device 600 related to this application, and the assemblies such as a bus and an input/output interface are omitted. Besides, according to a specific application case, the electronic device 600 may further include any other suitable assemblies.

Second Embodiment

A method for identifying a working area by a conventional automatic mower includes laying out a boundary wire along a boundary of the working area or along the periphery of an obstacle. The boundary wire transmits an electric signal and generates an electromagnetic field. A sensor on the automatic mower detects an electromagnetic field signal, and determines whether the automatic mower is located inside or outside an area limited by the boundary wire. The method of laying out the boundary wire is troublesome and affects the appearance of the lawn.

To enable the automatic mower to identify the working area and not to lay out the boundary wire, a method for establishing a working area map can be used. One method for establishing a working area map includes: recording position coordinates of the boundary and obstacle of the working area, establishing a coordinate system, and generating a working area map. When the automatic working system is working, a position and map of the automatic mower are compared to determine whether the automatic mower is in a safe working area.

During an actual process of generating a map, an obstacle may exist, and the obstacle may be a water tower, a bush, a building, or the like. In such a scenario, when the working area of the moving object is adjacent to the obstacle, a blocked area cannot receive a signal smoothly and position information (for example, a position coordinate) of a positioning signal recorded by a positioning device may have a large offset. Therefore, the signal needs to be compensated in such a case.

The second embodiment provides a signal compensation method, the signal compensation method in the second embodiment is different from that in the first embodiment in that, the second embodiment includes a base station, and signal compensation is performed based on a synchronization satellite signal transmitted by the base station, and the embodiment is specifically described as follows.

In this embodiment of the present invention, the automatic working system includes an autonomous moving device that moves autonomously in a limited working area, and positions the mobile station, and the mobile station moves along the boundary of the working area and collects information of position points of the working area, so as to generate a map.

The autonomous moving device can be an unattended device such as an automatic lawn mower, an automatic cleaner, an automatic irrigation device, and an automatic snowplow.

Furthermore, the automatic working system can further include a base station. The base station and the mobile station both receive a satellite signal, and the base station sends a positioning correction signal to the mobile station, so as to implement differential satellite positioning. For example, the base station and the mobile station can receive a Global Position System (GPS) positioning signal, and realizes Differential Global Positioning System (DGPS) positioning, or the base station and the mobile station can also receive a positioning signal from a Galileo satellite navigation system, a Beidou satellite navigation system, a Global Navigation Satellite System (GLONASS), or the like, but the embodiments of the present invention are not limited thereto.

In this embodiment of the present invention, an example in which the base station and the mobile station receive a GPS positioning signal is used.

In this embodiment of the present invention, the base station can include a satellite signal receiver, configured to receive a GPS positioning signal sent by a satellite; a signal processor, configured to generate a positioning correction signal according to the positioning signal received by the satellite signal receiver; a radio data transmission module, configured to send the positioning correction signal to the mobile station; and an indicator, configured to output an indication indicating whether a satellite signal at a current position is normal.

The radio data transmission module can include a radio station and a radio station antenna. Furthermore, to ensure reliability of long distance transmission between the base station and the mobile station, the radio data transmission module may further include a Sub-1G, Wi-Fi, or 2G/3G/4G/5G module, but the present invention is not limited thereto.

Optionally, the base station can be disposed in a charging station to be integrally formed with the charging station, so as to be supplied with power by using the charging station. Certainly, the base station can be separated from the charging station, for example, can be disposed at a position such as a roof that can receive a satellite signal more smoothly.

Correspondingly, the mobile station can also include a housing; a satellite signal receiver, configured to receive a GPS positioning signal sent by the satellite; a signal processor, configured to process a positioning signal received by the satellite signal receiver; a radio data transmission module, configured to receive a positioning correction signal sent by the base station, where the radio data transmission module can include a radio station and a radio station antenna; and an indicator, configured to output an indication indicating whether a satellite signal at a current position is normal.

In this embodiment of the present invention, the mobile station can be integrated with an inertial navigation unit, and the inertial navigation unit is configured to output inertial navigation data. When the mobile station is working, navigation can be performed by using only a GPS positioning signal, a positioning signal acquired by merging a GPS positioning signal and inertial navigation data, or only the inertial navigation data when a GPS signal is weak. The errors of the inertial navigation data are accumulated as time goes on.

In this embodiment of the present invention, the mobile station can be detachably connected to the housing of the autonomous moving device. In one of the embodiments, the mobile station can include a first interface connected to the housing of the autonomous moving device. When the autonomous moving device is working, the mobile station is installed on the housing of the autonomous moving device. When the mobile station is connected to the housing of the autonomous moving device, the mobile station can be electrically connected to a control module of the autonomous moving device, and the mobile station outputs a coordinate of a current position of the autonomous moving device, so that the control module can control the autonomous moving device to move and work according to the current position of the autonomous moving device. Alternatively, the mobile station outputs a control instruction according to the coordinate of the current position, and the control module of the autonomous moving device controls the autonomous moving device to move or work based on the control instruction.

It should be noted that, in this embodiment of the present invention, the mobile station can include an independent power supply module that can work independently when the mobile station is separated from the housing of the autonomous moving device.

Figure 22:
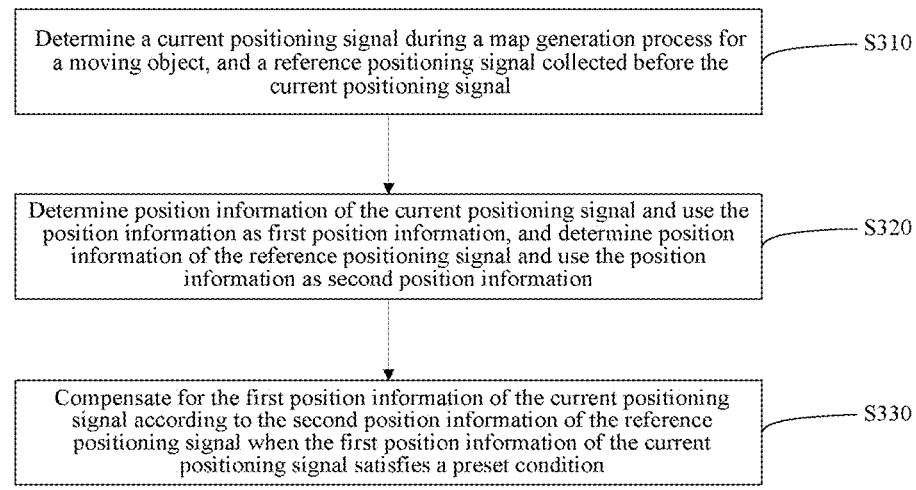
FIG. 22 is a schematic flowchart of a signal compensation method during a map generation process according to a second embodiment of the present invention.

FIG. 22 is a schematic flowchart of a signal compensation method during a map generation process according to an embodiment of the present invention. The mobile station moves along a boundary of the working area and collects information of position points through which it passes, so as to generate a map.

In this embodiment, an example in which the signal compensation method during the map generation process is applied to a signal compensation apparatus during the map generation process is used for description.

In this embodiment, the signal compensation apparatus during the map generation process can be disposed in a server or a mobile station, but the embodiments of the present invention is not limited thereto.

An electronic device is, for example, a personal computer (PC), a cloud device, or a mobile device, and the mobile device is, for example, a smartphone or a tablet computer.

It should be noted that, this embodiment of this application may be executed by, as hardware, for example, a server or a central processing unit (CPU) in the electronic device, and as software, for example, a backend management service in the server or the electronic device, but the present invention is not limited thereto.

In this embodiment of the present invention, an example in which the signal compensation apparatus during the map generation process is disposed in the mobile station is used for description.

Referring to FIG. 22, the method includes:

S310: Determine a current positioning signal during a map generation process for a moving object, and a reference positioning signal collected before the current positioning signal.

The moving object can be, for example, a mobile station, but the present invention is not limited thereto.

The generated map can serve as a working area of the moving object, but the present invention is not limited thereto.

It can be understood that, a map can be generated in a manner that, for example, a user circles a working area of an automatic mower on a Google map. The mobile station and the automatic mower are integrally formed, the automatic mower works for one circle along the working area. For example, the user pushes the automatic mower to work, the user remotely controls the automatic mower to work, the automatic mower follows a movement track of the user, or the automatic mower works automatically, but the present invention is not limited thereto.

In an embodiment of the present invention, the mobile station and the automatic mower are disposed separately. The mobile station is held by a user to walk along the working area for one circle, and a map is generated according to positioning signal data collected during the moving process of the mobile station, but the present invention is not limited thereto.

During an actual map generation process, referring to FIG. 9, FIG. 9 is a schematic diagram of a signal compensation scenario according to an embodiment of the present invention, which includes an obstacle 10 and a working area 11, and the obstacle 10 can be, for example, a water tower, a bush, or a building. In such a scenario, when the working area 11 of the moving object is adjacent to the obstacle 10, a blocked area cannot receive a signal smoothly, the position information (for example, a position coordinate) of the positioning signal recorded by the mobile station may be shown in FIG. 10. Referring to FIG. 10, FIG. 10 is a schematic diagram of position information of signal compensation according to an embodiment of the present invention, including a position information module 12 corresponding to the obstacle, and as shown in FIG. 10, the position information of the positioning signal has a large offset. Therefore, this embodiment of the present invention proposes compensating for the signal in the aforementioned case and can enhance map generation effects efficiently.

During a specific process of implementing this embodiment of the present invention, first, a current positioning signal during a map generation process for the moving object and a reference positioning signal collected before the current positioning signal are determined, a quantity of reference positioning signals is at least two, and this embodiment can be implemented in real time or at a predetermined time interval. If this embodiment is implemented in real time, in a process that the mobile station is held by a user to walk along the working area, a current positioning signal during the map generation process for the moving object is determined in real time, and if this embodiment is implemented at a preset time interval, a current positioning signal during the map generation process for the moving object is determined at the preset time interval, but the present invention is not limited thereto.

Referring to FIG. 10, FIG. 10 further includes three reference positioning signals 13 and a current positioning signal 14. It can be understood that, as time goes on, the current positioning signal 14 is updated continuously till the map is generated, and a positioning signal determined and acquired at a current time point can be used as a current positioning signal.

S320: Determine position information of the current positioning signal and use the position information as first position information, and determine position information of the reference positioning signal and use the position information as second position information.

The first position information/second position information can be, for example, a position coordinate, and according to the working principle of the mobile station, can be position information of a current positioning signal collected in real time during a process that the mobile station is held by a user to walk along the working area, the position information can be referred to as first position information, and the position information of the reference positioning signal is collected and can be referred to as second position information.

In this embodiment of the present invention, position information of the reference positioning signal is determined by determining position information of the reference positioning signal collected before the current positioning signal, and then, signal compensation is performed according to the position information. The implementation and data collection are simple, and an existing device can be used to collect the data, thereby avoiding consuming undue hardware costs.

S330: Compensate for the first position information of the current positioning signal according to the second position information of the reference positioning signal when the first position information of the current positioning signal satisfies a preset condition.

Optionally, the preset condition includes: a first precision value of the current positioning signal is less than a first preset precision threshold or a difference between the first position information and the second position information is greater than a preset threshold. In one of the embodiments, the preset condition is determined to be satisfied according to the first precision value of the current positioning signal being less than the first preset precision threshold and the difference between the first position information and the second position information being greater than the preset threshold.

The first preset precision threshold and the preset threshold can be set by a user according to an actual application demand or can also be preset by a factory program of a signal compensation device during the map generation process, but the present invention is not limited thereto.

During a specific implementation process, this embodiment of the present invention can use a precision measurement algorithm in a related technology to determine a precision value of the current positioning signal, and the precision value can be referred to as a first precision value, but the present invention is not limited thereto.

In this embodiment of the present invention, the first position information of the current positioning signal is compensated according to the second position information of the reference positioning signal only when it is detected that the first position information of the current positioning signal satisfies the preset condition, and otherwise, signal compensation is not triggered, thereby avoiding memory resource consumption caused by unnecessary triggering of signal compensation and enhancing compensation efficiency.

Optionally, moving track information of the moving object can be determined according to the second position information of at least two reference positioning signals and the moving track information is used as first moving track information. The first position information of the current positioning signal is compensated according to the first moving track information.

As shown in FIG. 10, for the three reference positioning signals 13 and the current positioning signal 14, during a signal compensation process, the second position information (that is, the position coordinates) of each of the three reference positioning signals 13 can be determined first, the moving track information of the moving object is determined (the moving track information can be represented by a line connecting the three reference positioning signals 13 in FIG. 10), and the moving track information can be referred to as the first moving track information.

It can be understood that, if it is necessary to perform signal compensation on the current positioning signal 14, it can be assumed that an obstacle exists at the position coordinate of the current positioning signal 14, but no obstacle exists at the position coordinates of the three reference positioning signals 13 collected before the current positioning signal 14. Therefore, signal compensation can be performed on the position information of the current positioning signal 14 with reference to the previous first moving track information, thereby ensuring the reference value of the reference data of signal compensation efficiently and enhancing accuracy of signal compensation.

This embodiment can efficiently weaken the impact caused by the obstacle during the map generation process and enhance map generation effects by determining the current positioning signal during the map generation process for the moving object and the reference positioning signal collected before the current positioning signal; determining the position information of the current positioning signal and using the position information as the first position information, and determining the position information of the reference positioning signal and using the position information as the second position information; and compensating for the first position information of the current positioning signal according to the second position information of the reference positioning signal when the first position information of the current positioning signal satisfies the preset condition.

Figure 23:
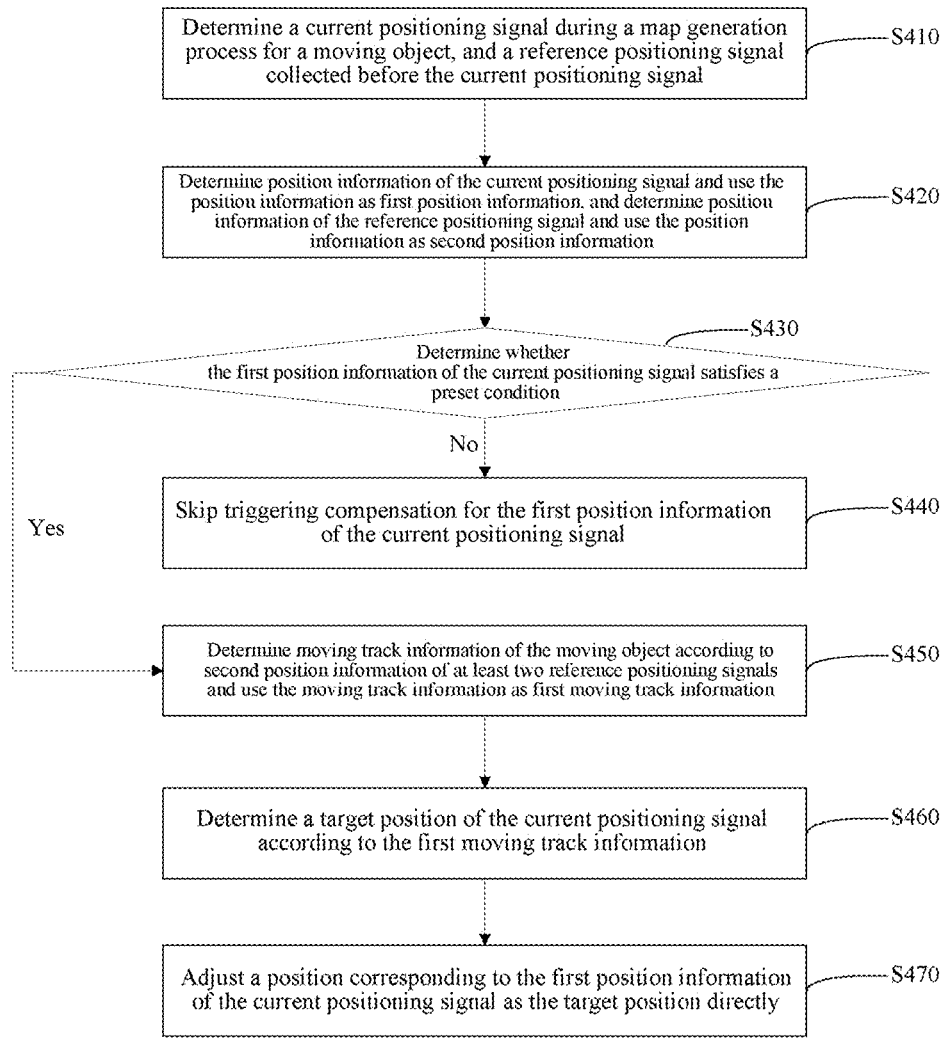
FIG. 23 is a schematic flowchart of a signal compensation method during a map generation process according to another embodiment of the present invention.

FIG. 23 is a schematic flowchart of a signal compensation method during a map generation process according to another embodiment of the present invention.

Referring to FIG. 23, the method includes the following steps.

S410: determine a current positioning signal during a map generation process for a moving object, and a reference positioning signal collected before the current positioning signal.

During a specific implementation process, this embodiment of the present invention determines a current positioning signal during the map generation process for the moving object and a reference positioning signal collected before the current positioning signal, a quantity of reference positioning signals is at least two, and the implementation of the present invention can be in real time or at a preset time interval.

Referring to FIG. 10, FIG. 10 further includes three reference positioning signals 13 and a current positioning signal 14, arrows 15, and a second positioning signal 16 (the second positioning signal 16 is a positioning signal collected after the current positioning signal 14). It can be understood that, as time goes on, the current positioning signal 14 is continuously updated till the map is generated, and the positioning signal determined at a current time point can be used as a current positioning signal.

S420: Determine position information of the current positioning signal and use the position information as first position information, and determine position information of the reference positioning signal and use the position information as second position information.

The first position information/second position information can be, for example, a position coordinate, and according to the working principle of the mobile station, can be position information of a current positioning signal collected in real time during a process that the mobile station is held by a user to walk along a working area, the position information can be referred to as first position information, the position information of the reference positioning signal is collected and can be referred to as second position information.

S430: Determine whether the first position information of the current positioning signal satisfies a preset condition, if the first position information of the current positioning signal satisfies the preset condition, perform S450 and the following steps, and otherwise, perform S440.

Optionally, the preset condition includes: a first precision value of the current positioning signal is less than a first preset precision threshold or a difference between the first position information and the second position information is greater than a preset threshold. In one of the embodiments, the preset condition is determined to be satisfied according to the first precision value of the current positioning signal being less than the first preset precision threshold and the difference between the first position information and the second position information being greater than the preset threshold. The first preset precision threshold and the preset threshold can be set by a user according to an actual application demand or can also be preset by a factory program of a signal compensation apparatus during the map generation process, but the present invention is not limited thereto.

S440: Skip triggering compensation for the first position information of the current positioning signal.

S450: Determine moving track information of the moving object according to second position information of at least two reference positioning signals and use the moving track information as first moving track information.

Referring to FIG. 10, for the three reference positioning signals 13 and the current positioning signal 14, the arrow 15, and the second positioning signal 16 (the second positioning signal 16 is a positioning signal collected after the current positioning signal 14), during a signal compensation process, the second position information (that is, the position coordinates) of each of the three reference positioning signals 13 can be determined first, the moving track information of the moving object is determined (the moving track information can be represented by a line connecting the three reference positioning signals 13 in FIG. 10), and the moving track information can be referred to as first moving track information.

It can be understood that, if it is necessary to perform signal compensation on the current positioning signal 14, it can be assumed that an obstacle exists at the position coordinate of the current positioning signal 14, but no obstacle exists at the position coordinates of the three reference positioning signals 13 collected before the current positioning signal 14. Therefore, signal compensation can be performed on the position information of the current positioning signal 14 with reference to the previous first moving track information, thereby ensuring the reference value of the reference data of signal compensation efficiently and enhancing accuracy of signal compensation.

S460: Determine a target position of the current positioning signal according to the first moving track information.

In this embodiment of the present invention, according to the first moving track information, a position where the current positioning signal shall appear along the first moving track information is determined, and the position is used as the target position.

It can be understood that, due to the continuity of boundary data during the map generation process, position information of a positioning signal at a boundary of the working area is rule-based, and is unlikely to be random position information. Therefore, in this embodiment of the present invention, the target position of the current positioning signal can be determined according to the previous moving track information.

S470: Adjust a position corresponding to the first position information of the current positioning signal as the target position directly.

Referring to FIG. 10, the position corresponding to the position information of the current positioning signal 14 is adjusted to be a target position along a direction of the arrow 15. The target position is located on an extended line (the dashed line in FIG. 10) in the direction of the first moving track as shown in FIG. 10.

In this embodiment of the present invention, the lines and dashed lines in FIG. 10 are not always straight lines, and In one of the embodiments, they can be smooth lines to realize smooth transition of the compensated position signal and reduce a positioning error of the generated map as far as possible.

In this embodiment, signal compensation is performed according to the position information. The implementation and data collection are simple, and an existing device can be used to collect the data, thereby avoiding consuming undue hardware costs. When it is detected that the first position information of the current positioning signal satisfies the preset condition, the first position information of the current positioning signal is compensated according to the second position information of the reference positioning signal, and otherwise, signal compensation is not triggered, thereby avoiding memory resource consumption caused by unnecessary triggering of signal compensation and enhancing compensation efficiency. Signal compensation can be performed on the position information of the current positioning signal with reference to the previous moving track information, thereby ensuring the reference value of the reference data of signal compensation efficiently, weakening the impact caused by the obstacle during the map generation process efficiently, and enhancing map generation effects.

FIG. 12 is a schematic flowchart of a signal compensation method during a map generation process according to another embodiment of the present invention.

Referring to FIG. 12, after S103, the method may further include the following steps.

S501: Acquire a second positioning signal collected after the current positioning signal.

Referring to the second positioning signal 16 in FIG. 10, the positioning signal collected after the current positioning signal 14 can be referred to as a second positioning signal. In this embodiment of the present invention, after a plurality of positioning signals at different time points is compensated, all the compensated plurality of positioning signals at different time points can be used as the compensated current positioning signals. Referring to FIG. 10, assuming that three current positioning signals exist at the three corresponding different time points, a positioning signal collected after the three current positioning signals can be used as a second positioning signal.

S502: Determine a second precision value of the second positioning signal, and determine moving track information between the compensated current positioning signal and the second positioning signal as second moving track information.

During a specific implementation process, this embodiment of the present invention can use a precision measurement algorithm in a related technology to determine a precision value of the second positioning signal, and the precision value can be referred to as a second precision value, but the present invention is not limited thereto.

Then, the moving track information between the compensated current positioning signal and the second positioning signal is determined.

S503: Perform smooth filtering on the first moving track information and the second moving track information if the second precision value is greater than or equal to a second preset precision threshold.

S504: Update the second moving track information according to the first moving track information if the second precision value is less than the second preset precision threshold.

Referring to FIG. 13 and FIG. 14, FIG. 13 is a schematic diagram of a moving track after smooth filtering according to an embodiment of the present invention, and FIG. 14 is a schematic diagram of an updated moving track according to an embodiment of the present invention. FIG. 13 includes three reference positioning signals 61 and compensated positioning signals 62 corresponding to three different time points, and three second positioning signals 63 (the three second positioning signals 63 are positioning signals collected after the compensated positioning signals 62 corresponding to the three different time points). FIG. 14 includes three reference positioning signals 71 and compensated positioning signals 72 corresponding to three different time points, and three second positioning signals 73 (the three second positioning signals 73 are positioning signals collected after the compensated positioning signals 72 corresponding to the three different time points).

The second preset precision threshold can be set by a user according to an actual application demand, or can also be preset by a factory program of a signal compensation apparatus during the map generation process, but the present invention is not limited thereto.

In this embodiment of the present invention, when the second precision value is greater than or equal to the second preset precision threshold, the second positioning signal can be determined as a high-precision signal. In this case, signal compensation cannot be performed on the second positioning signal any longer, and smooth filtering can be performed on the first moving track information and the second moving track information. Referring to FIG. 13, when the second precision value is less than the second preset precision threshold, the second positioning signal is determined as a low-precision signal. In this case, the second moving track information can be updated according to the first moving track information. In one of the embodiments, a positioning signal at a latest time point among the compensated positioning signals corresponding to the three different time points is used as a high-precision signal, and referring to FIG. 14, the following second moving track information of the high-precision signal is offset according to the first moving track information.

During an actual map generation process of the present invention, a positioning signal is usually offset toward the outside of the working area if an obstacle exists. Therefore, the position coordinate of the compensated positioning signal in this embodiment of the present invention is offset towards the inside of the working area, so as to prevent the automatic mower from driving out of the working area. Therefore, this embodiment of the present invention can perform signal compensation according to an actual condition.

Furthermore, in this embodiment of the present invention, in a process of recording a positioning signal, a user can observe a generated map in real time, that is, the generated map can be partially displayed as time goes on and signal compensation is performed in real time.

Furthermore, in this embodiment of the present invention, a reminder module can be further disposed in the mobile station, and is configured to remind a user of a quality condition of a current positioning signal, so that the user can adjust a behavior during the map generation process according to the quality condition of the current positioning signal, for example, working toward a direction having a good signal and abandoning an area and a path affected by an obstacle, or the map can also be perfected in a manual editing manner, but the present invention is not limited thereto.

In this embodiment, the second positioning signal collected after the current positioning signal is acquired, the second precision value of the second positioning signal is determined, and the moving track information between the compensated current positioning signal and the second positioning signal is determined and used as the second moving track information. If the second precision value is greater than or equal to the second preset precision threshold, smooth filtering is performed on the first moving track information and the second moving track information, and if the second precision value is less than the second preset precision threshold, the second moving track information is updated according to the first moving track information, so that the compensated position signal can be transited smoothly, thereby reducing the positioning error of the generated map as far as possible.

Figure 24:
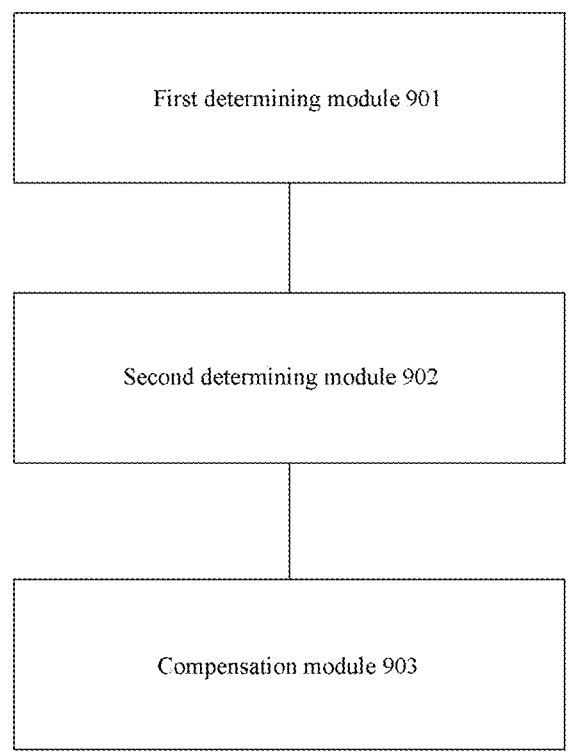
FIG. 24 is a schematic structural diagram of a signal compensation apparatus during a map generation process according to an embodiment of the present invention.

FIG. 24 is a schematic structural diagram of a signal compensation apparatus during a map generation process according to an embodiment of the present invention.

Referring to FIG. 24, the signal compensation apparatus 900 includes:

a first determining module 901, configured to determine a current positioning signal during a map generation process for a moving object, and a reference positioning signal collected before the current positioning signal;

a second determining module 902, configured to determine position information of the current positioning signal and use the position information as first position information, and determine position information of the reference positioning signal and use the position information as second position information; and a compensation module 903, configured to compensate for the first position information of the current positioning signal according to the second position information of the reference positioning signal when the first position information of the current positioning signal satisfies a preset condition.

Optionally, the preset condition includes: a first precision value of the current positioning signal is less than a first preset precision threshold; or a difference between the first position information and the second position information is greater than a preset threshold. In one of the embodiments, the preset condition is determined to be satisfied first according to the first precision value of the current positioning signal being less than the first preset precision threshold and the difference between the first position information and the second position information being greater than the preset threshold.

Figure 25:
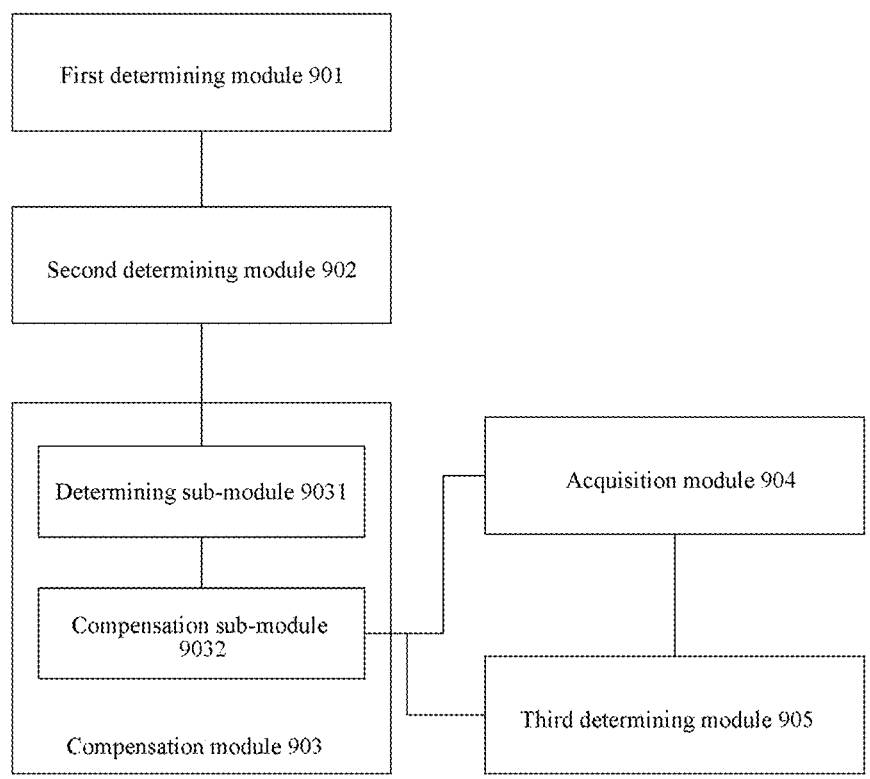
FIG. 25 is a schematic structural diagram of a signal compensation device during a map generation process according to another embodiment of the present invention.

Optionally, in some embodiments, referring to FIG. 25, a quantity of reference positioning signals is at least two, and the compensation module 903 includes:

a determining sub-module 9031, configured to determine moving track information of the moving object according to the second position information of at least two reference positioning signals and use the moving track information as first moving track information; and a compensation sub-module 9032, configured to compensate for the first position information of the current positioning signal according to the first moving track information.

Optionally, in some embodiments, the compensation sub-module 9032 is specifically configured to:

determine a target position of the current positioning signal according to the first moving track information; and adjust a position corresponding to the first position information of the current positioning signal as the target position directly.

Optionally, in some embodiments, referring to FIG. 25, the apparatus 900 further includes:

an acquisition module 904, configured to acquire a second positioning signal collected after the current positioning signal; and a third determining module 905, configured to determine a second precision value of the second positioning signal, and determine moving track information between the compensated current positioning signal and the second positioning signal and use the moving track information as second moving track information.

The compensation module 903 is further configured to perform smooth filtering on the first moving track information and the second moving track information when the second precision value is greater than or equal to the second preset precision threshold, and update the second moving track information according to the first moving track information when the second precision value is less than the second preset precision threshold.

It should be noted that, the explanation and illustration about the embodiments of the signal compensation method during the map generation process shown in FIG. 9 and FIG. 10, FIG. 12 to FIG. 14, and FIG. 22 to FIG. 25 are also applicable to the signal compensation apparatus 900 during the map generation process in this embodiment, and the implementation principles thereof are similar and are not repeated herein.

This embodiment can efficiently weaken the impact caused by an obstacle during a map generation process and enhance map generation effects by determining a current positioning signal during the map generation process for the moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

To implement the aforementioned embodiment, the present invention further provides a non-transitory computer readable storage medium. When an instruction in the storage medium is executed by a processor at a terminal, the terminal can perform a signal compensation method during a map generation process, and the method includes:

determining a current positioning signal during a map generation process for a moving object, and a reference positioning signal collected before the current positioning signal;

determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The non-transitory computer readable storage medium in this embodiment can efficiently weaken the impact caused by an obstacle during a map generation process and enhance map generation effects by determining a current positioning signal during a map generation process for a moving object, and a reference positioning signal collected before a current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

To implement the aforementioned embodiment, the present invention further provides a computer program product.

When an instruction in the computer program product is executed by a processor, the processor performs a signal compensation method, and the method includes:

determining a current positioning signal during a map generation process for a moving object, and a reference positioning signal collected before the current positioning signal;

determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

The computer program product in this embodiment can efficiently weaken the impact caused by an obstacle during a map generation process and enhance map generation effects by determining a current positioning signal during a map generation process for a moving object, and a reference positioning signal collected before the current positioning signal; determining position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

It should be noted that, in the description of the present invention, the terms "first" and "second" are only used for description, and cannot be understood to indicate or imply relative importance. In addition, in the description of the present invention, unless otherwise specified, "a plurality of" means two or more.

Any process or method described in the flowchart or by using other manners herein can be understood to be a module, a segment or a part of code representing executable instructions of one or more steps for implementing specific logic functions or processes, and furthermore, the preferred embodiments of the present invention include additional implementation, the functions may not be implemented in the sequences shown or discussed, including in a basically simultaneous manner or an opposite sequence according to the involved functions, and this can be understood by a person skilled in the art.

It should be understood that, each part of the present invention can be implemented by hardware, software, firmware, or any combination thereof. In the aforementioned implementations, a plurality of steps or methods can be implemented by software or firmware stored in a memory and executed by a suitable instruction execution system. For example, if a step or a method is implemented by hardware, as in another implementation, the step or the method can be implemented by any one of the following technologies that are known in the art or a combination thereof: a discreet logic circuit having a logic gate circuit for implementing a logic function for a data signal, an application specific integrated circuit having a suitable combinational logic gate circuit, a programmable gate array (PGA), a field programmable gate array (FPGA), and the like.

A person of ordinary skill in the art can understand all or some steps of the methods in the embodiments can be implemented by programs instructing relevant hardware, the programs can be stored in a computer readable storage medium, and when the programs are executed, one of the steps of the method embodiment or a combination thereof is included.

Furthermore, each functional unit in each embodiment in the present invention can be integrated in a processing module or exist independently and physically, or two or more units are integrated in one module. The integrated modules can be implemented not only by hardware but also by software functional modules. If an integrated module is implemented in a form of a software functional module and sold and used as an independent product, the integrated module can also be stored in a computer readable storage medium.

The storage medium stated above can be a read-only memory, a magnetic disc, an optical disc, or the like.

Third Embodiment

A method for identifying a working area by a conventional automatic mower includes laying out a boundary wire along a boundary of the working area or along the periphery of an obstacle. The boundary wire transmits an electric signal and generates an electromagnetic field. A sensor on the automatic mower detects an electromagnetic field signal, and determines whether the automatic mower is located inside or outside an area limited by the boundary wire.

A disadvantage of the method is that it is troublesome to lay out the boundary wire and the boundary wire affects the appearance of the lawn.

To enable the automatic mower to identify the working area and not to lay out the boundary wire, a method for establishing a working area map can be used. One method for establishing a working area map includes: recording position coordinates of the boundary and obstacle of the working area, establishing a coordinate system, and generating a working area map. When the automatic working system is working, a position and map of the automatic mower are compared to determine whether the automatic mower is in a safe working area.

If such a method is used, a navigation function is needed. That is, a coordinate and a direction of the automatic mower both need to be learned. Therefore, another technical problem for the method is how to determine the direction of the automatic lawn mower.

The third embodiment provides a method for determining a direction of an autonomous moving device, and the method for determining a direction of an autonomous moving device in the third embodiment is different from the first embodiment in that, a navigation module in the third embodiment includes a base station, and the embodiment is specifically described as follows.

Summary of the Automatic Working System

Figure 26:
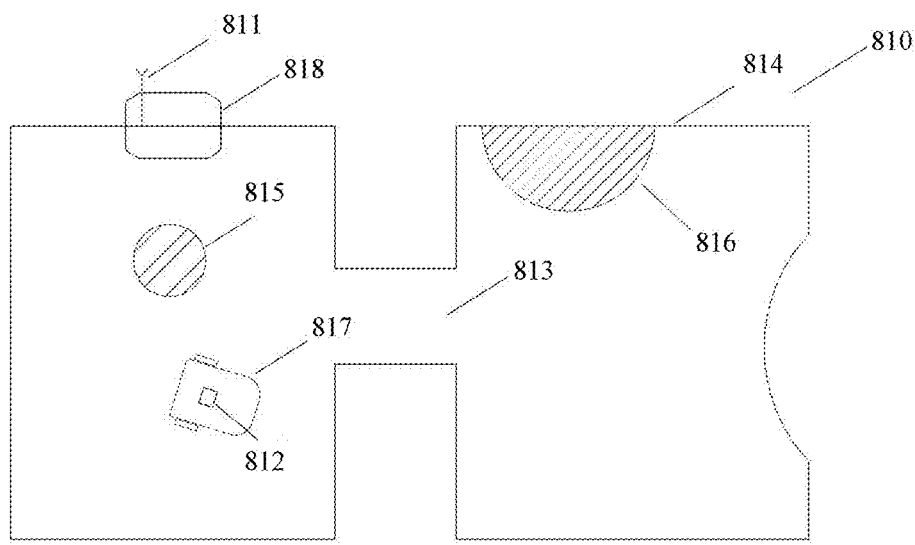
FIG. 26 is a schematic diagram of an automatic working system according to an embodiment of the present invention.

FIG. 26 is a schematic diagram of an automatic working system 810 according to an embodiment of the present invention. The automatic working system includes an autonomous moving device. In this embodiment, the autonomous moving device is an automatic mower 817, and in other embodiments, the autonomous moving device can also be an unattended device such as an automatic cleaner, an automatic irrigation device, and an automatic snowplow. The automatic working system 810 further includes a charging station 818 configured to supply electric energy for the automatic mower 817. In this embodiment, the automatic working system 810 includes a navigation module, configured to output a current position of the automatic lawn mower. In one of the embodiments, the navigation module includes a base station 811 and a mobile station 812.

As shown in FIG. 26, the automatic working system is configured to work in a predetermined working area. In this embodiment, the working area includes at least two separated working sub-areas that are in communication with each other through a passageway 813. A boundary 814 is formed between the working area and a non-working area, and the working area includes obstacles 815 and 816, and the obstacles include trees, pits, and the like.

Figure 27:
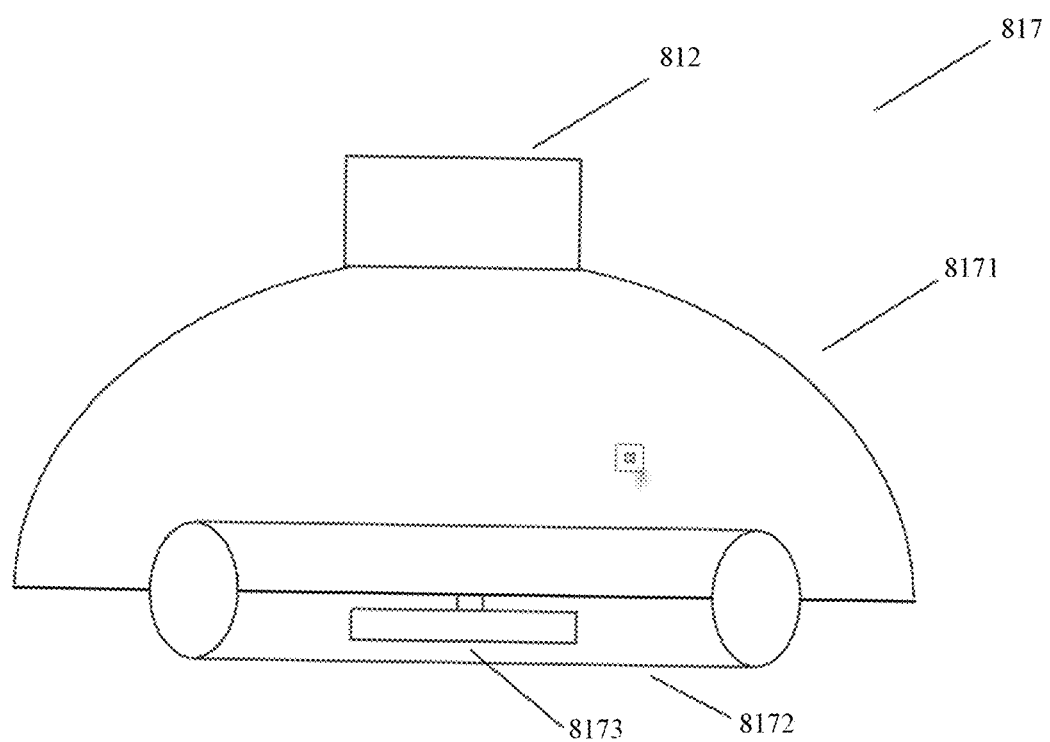
FIG. 27 is a schematic structural diagram of an automatic mower according to an embodiment of the present invention.

The structure of the automatic mower 817 in this embodiment is shown in FIG. 27. The automatic mower 817 includes a housing 8171, a moving module, a task execution module, an energy module, and a control module. The moving module includes a caterpillar belt 8172 driven by a drive motor to drive the automatic mower 817 to move. The task execution module includes a cutting assembly 8173 to mow grass. The energy module includes a battery pack (not shown) that provides electric energy for movement and working of the automatic mower 817. The control module is electrically connected to the moving module, the task execution module, and the energy module, and controls the moving module to drive the automatic mower 817 to move, and controls the task execution module to execute a working task.

Figure 28:
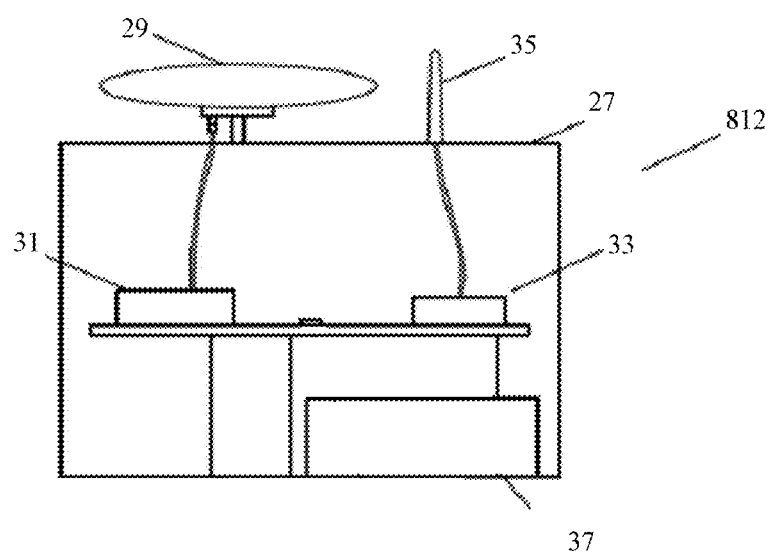
FIG. 28 is a schematic composition diagram of a navigation module according to an embodiment of the present invention.
Figure 29:
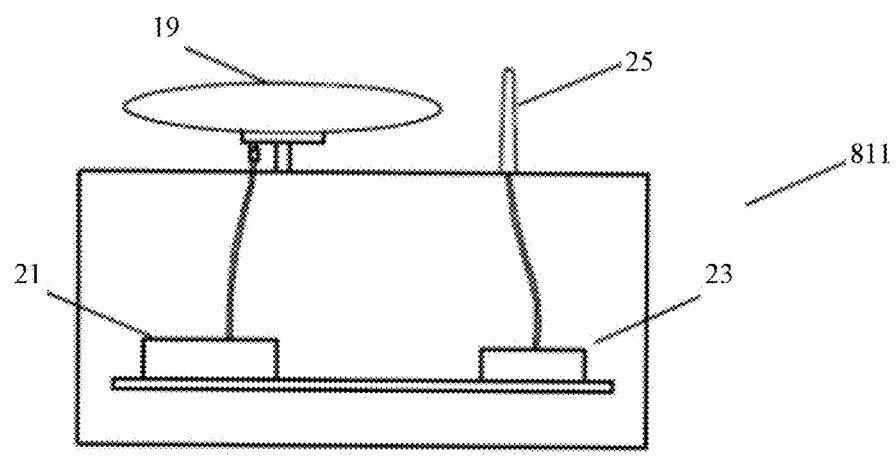
FIG. 29 is a schematic composition diagram of a navigation module according to an embodiment of the present invention.

The composition of the navigation module in this embodiment is shown in FIG. 28 and FIG. 29. The navigation module includes a base station 811 and a mobile station 812. The base station 811 and the mobile station 812 both receive a satellite signal, and the base station 811 sends a positioning correction signal to the mobile station 812, so as to implement differential satellite positioning. In this embodiment, the base station 811 and the mobile station 812 receive a GPS positioning signal to realize differential GPS positioning. Certainly, in other embodiments, the base station 811 and the mobile station 812 can also receive a positioning signal from a Galileo satellite navigation system, a Beidou satellite navigation system, a GLONASS, or the like.

As shown in FIG. 29, in this embodiment, the base station 811 includes a GPS antenna 19 configured to receive a GPS positioning signal; a GPS board card 21 configured to process the received GPS positioning signal, and generate a positioning correction signal; a communications module 23, configured to send the positioning correction signal to the mobile station 812. In this embodiment, the communications module 23 includes a radio station and a radio station antenna 25. The base station further includes an indicator (not shown) that can output an indication indicating whether a satellite signal at a current position is normal. In this embodiment, the base station 811 is disposed at the charging station 818, and is integrally formed with the charging station 818. In other embodiments, the base station 811 can also be separated from the charging station 818, for example, can be disposed at a position such as a roof that can receive a satellite signal more smoothly.

As shown in FIG. 28, in this embodiment, the mobile station 812 includes a housing 27; a GPS antenna 29 configured to receive a GPS positioning signal; a GPS board card 31, configured to process the received GPS positioning signal; and a communications module 33, configured to receive a positioning correction signal sent by the base station 811. The communications module 33 includes a radio station and a radio station antenna 35. In this embodiment, the mobile station 812 is integrated with an inertial navigation unit (not shown), and the inertial navigation unit is configured to output inertial navigation data. When the mobile station 812 is working, navigation can be performed by using only a GPS positioning signal, a positioning signal acquired by merging a GPS positioning signal and inertial navigation data, or only the inertial navigation data when a GPS signal is weak. The mobile station 812 further includes an indicator (not shown), configured to output an indication indicating whether a differential GPS signal at a current position is normal. In this embodiment, the mobile station 812 is detachably connected to the housing 8171 of the automatic mower 817. The mobile station 812 includes a first interface (not shown) connected to the housing of the automatic mower 817. When the automatic mower 817 is working, the mobile station 812 is installed on the housing 8171 of the automatic mower 817. When being connected to the housing 8171 of the automatic mower 817, the mobile station 812 can be electrically connected to a control module of the automatic mower 817 and outputs a coordinate of a current position of the automatic mower 817, and the control module controls movement and work of the automatic mower 817 according to the current position of the automatic mower 817. Alternatively, the mobile station outputs a control instruction to the control module according to the coordinate of the current position. In this embodiment, the mobile station 812 includes an independent power supply module 37, and can work independently when separated from the housing 8171 of the automatic mower 817.

Exemplary Direction Determining Method

During a navigation process of the autonomous moving device, a coordinate and a direction of the autonomous moving device both need to be learned. For example, a steering direction needs to be learned before returning or when a preset path is deviated or a boundary is met.

A conventional method for determining a direction mainly measures a direction by using a sensor directly. For example, a variation of an angle can be acquired by using a gyroscope or the like, so as to determine a direction. However, the problem lies in that errors can be accumulated easily. Alternatively, an angle can be acquired directly by using a compass or the like, but the compass or the like can be easily affected by an environment and has a fixed error.

Based on the aforementioned technical problem, the method for determining a direction of an autonomous moving device according to this embodiment of the present invention determines a direction according to the position information.

Figure 30:
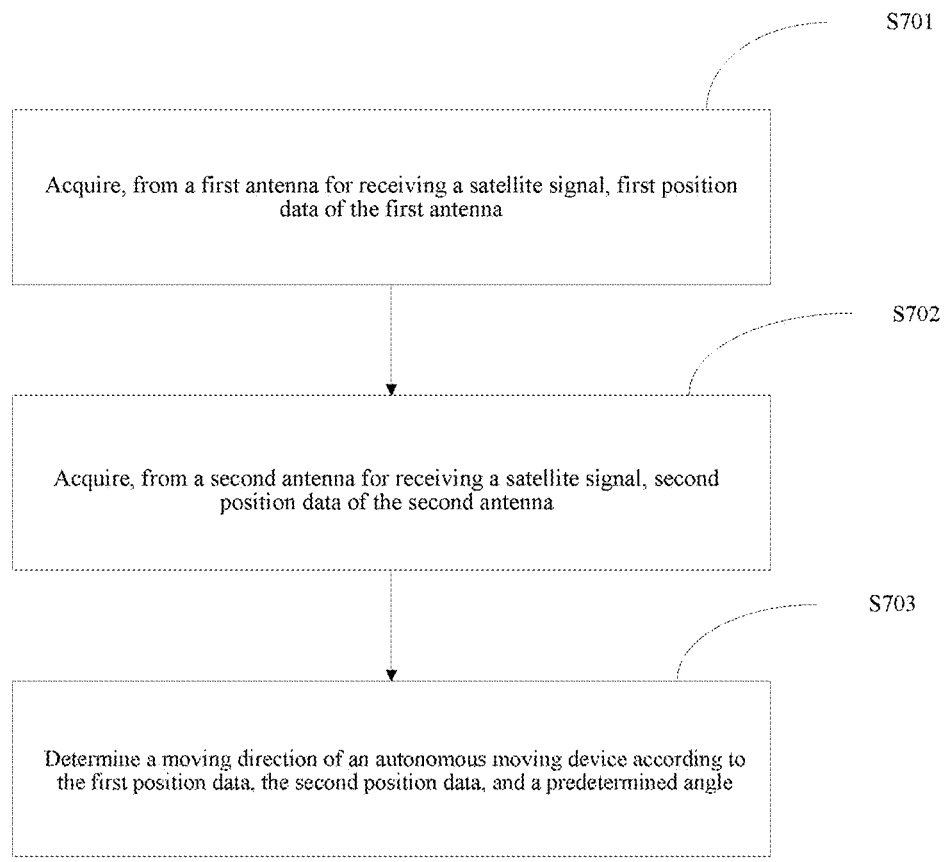
FIG. 30 is a schematic flowchart of a method for determining a direction of an autonomous moving device according to an embodiment of the present invention.

FIG. 30 is a schematic flowchart of a method for determining a direction of an autonomous moving device according to an embodiment of the present invention. As shown in FIG. 30, the method for determining a direction of an autonomous moving device according to an embodiment of the present invention includes: S701: acquiring, from a first antenna for receiving a satellite signal, first position data of the first antenna, the first antenna being disposed on the autonomous moving device; S702: acquiring, from a second antenna for receiving a satellite signal, second position data of the second antenna, the second antenna being disposed on the autonomous moving device, and a predetermined angle existing between a direction of a connecting line of the first antenna and the second antenna and a moving direction of the autonomous moving device; and S703: determining the moving direction of the autonomous moving device according to the first position data, the second position data, and the predetermined angle.

That is, in the method for determining a direction of an autonomous moving device according to this embodiment of the present invention, the moving direction of the autonomous moving device is determined through the positions of the two antennas installed on the autonomous moving device, thereby avoiding the problem of errors caused by the sensor, so as to determine the moving direction of the autonomous moving device accurately.

To determine the moving direction of the autonomous moving device more accurately, the first antenna and In one of the embodiments the second antenna are separated by a distance. That is, in the method for determining a direction of an autonomous moving device according to this embodiment of the present invention, the first antenna is disposed on a front part of a body of the autonomous moving device, and the second antenna is disposed on a rear part of the body of the autonomous moving device. Certainly, if only a distance between the first antenna and the second antenna is enough to determine a direction, the first antenna and the second antenna can also be installed on another position of the autonomous moving device.

In addition, the direction of the connecting line of the first antenna and the second antenna and the moving direction of the autonomous moving device may form a predetermined angle. In this way, if the direction of the connecting line of the first antenna and the second antenna is determined, the moving direction of the autonomous moving device can also be determined based on the predetermined angle. Certainly, the predetermined angle can also be 0 degrees. That is, the direction of the connecting line of the first antenna and the second antenna can be consistent with the moving direction of the autonomous moving device.

In this case, in the method for determining a direction of an autonomous moving device according to this embodiment of the present invention, the first antenna and the second antenna both can be disposed on a central axis of the body of the autonomous moving device.

In this way, the method for determining a direction of an autonomous moving device according to this embodiment of the present invention can output the moving direction of the autonomous moving device in real time.

In the method for determining a direction of an autonomous moving device according to this embodiment of the present invention, the position data of the antenna is acquired by a differential satellite positioning system.

In an embodiment, the autonomous moving device acquires the position data of the first antenna and the second antenna through a differential GPS signal.

To assist navigation when the satellite signal is weak, an inertial navigation unit can be further used.

That is, in the method for determining a direction of an autonomous moving device according to this embodiment of the present invention, the position data of the antenna is acquired by the differential satellite positioning system and the inertial navigation unit.

In addition, in the method for determining a direction of an autonomous moving device according to this embodiment of the present invention, an angular sensor, such as a compass and a gyroscope, can be further used to determine the moving direction of the autonomous moving device.

That is, the method for determining a direction of an autonomous moving device further includes determining the moving direction of the autonomous moving device through the angular sensor.

In one of the embodiments, a signal strength of the satellite signal can be determined first, and when the signal strength is less than a predetermined threshold, that is, the signal is weak, the moving direction of the autonomous moving device is determined in combination with the angular sensor.

That is, the method for determining a direction of an autonomous moving device further includes: determining whether the signal strength of the satellite signal is less than the predetermined threshold; and determining the moving direction of the autonomous moving device through the angular sensor in response to the signal strength of the satellite signal being less than the predetermined threshold.

Furthermore, in the method for determining a direction of an autonomous moving device, the angular sensor includes a compass, a gyroscope, or the like.

In an embodiment of the present invention, when the moving direction of the autonomous moving device is determined according to position data, the moving direction of the autonomous moving device can also be determined by fitting position data at different time points.

Figure 31:
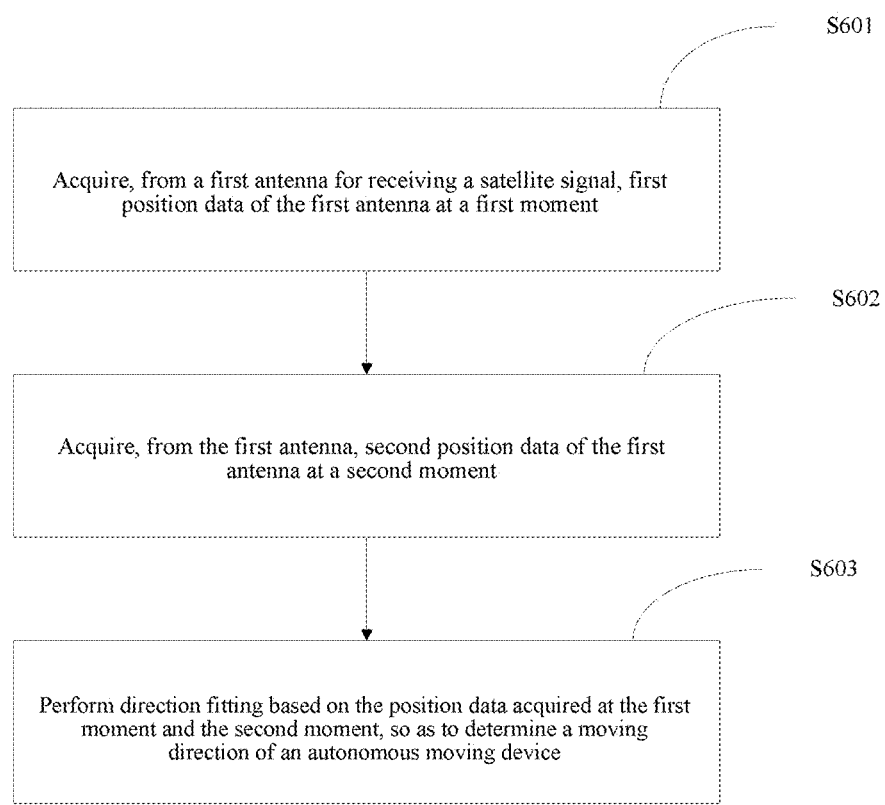
FIG. 31 is a schematic flowchart of a method for determining a direction of an autonomous moving device according to an embodiment of the present invention.

That is, as shown in FIG. 31, the method for determining a direction according to an embodiment of the present invention includes: S601: acquiring, from a first antenna for receiving a satellite signal, position data of the first antenna at a first moment, the first antenna being disposed on the autonomous moving device; S602: acquiring, from the first antenna, another position data of the first antenna at a second moment, the second moment being later than the first moment; and S603: performing direction fitting based on at least the position data acquired at the first moment and the second moment, so as to determine a moving direction of the autonomous moving device.

In the method for determining a direction of an autonomous moving device according to an embodiment of the present invention, a direction is fitted according to two positions on a time axis (before or after moving).

That is, direction fitting can be performed corresponding to the time axis according to a plurality of pieces of data being at a high precision coordinate for a period of time, so as to determine a moving direction of the autonomous moving device.

In the method for determining a direction of an autonomous moving device, an acquisition frequency of the position data is 1 Hz to 100 Hz.

In the method for determining a direction of an autonomous moving device, the acquisition frequency of the position data is 5 Hz.

In the method for determining a direction of an autonomous moving device, the position data of the antenna is acquired by the differential satellite positioning system and the inertial navigation unit.

In the method for determining a direction of an autonomous moving device, the moving direction of the autonomous moving device is determined through the angular sensor.

The method for determining a direction of an autonomous moving device includes: determining whether the signal strength of the satellite signal is less than the predetermined threshold; and determining the moving direction of the autonomous moving device through the angular sensor in response to the signal strength of the satellite signal being less than the predetermined threshold.

In the method for determining a direction of an autonomous moving device, the angular sensor includes a compass or a gyroscope.

In the method for determining a direction of an autonomous moving device, direction fitting can be performed only according to the position of the autonomous moving device acquired by a single antenna.

Exemplary autonomous moving device and automatic working system

Figure 32:
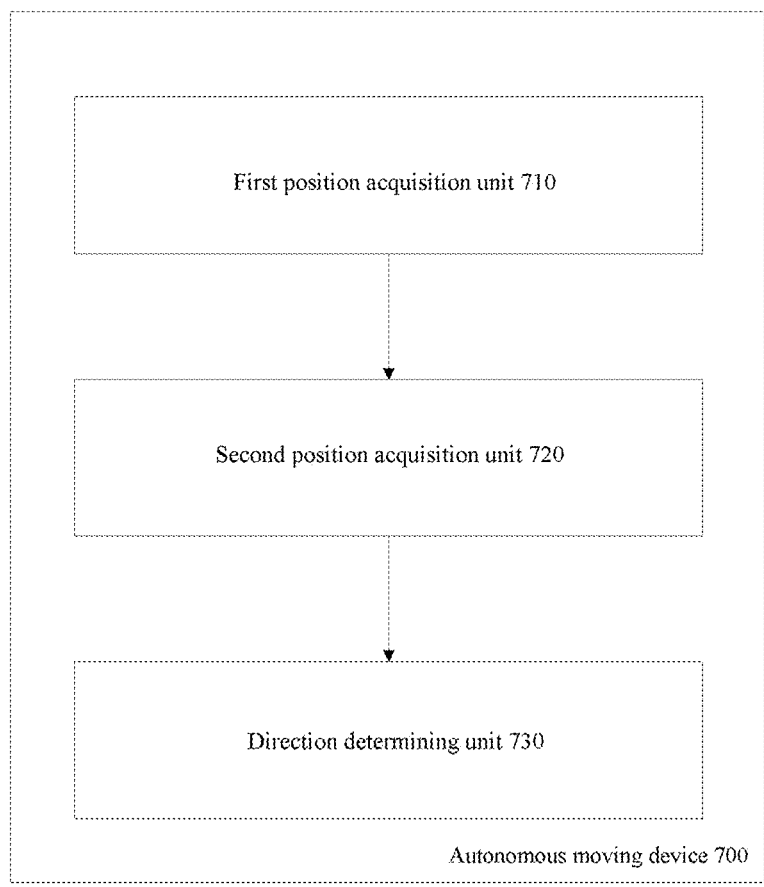
FIG. 32 is a schematic block diagram of an autonomous moving device according to an embodiment of the present invention.

FIG. 32 is a schematic block diagram of an autonomous moving device according to an embodiment of the present invention.

As shown in FIG. 32, the autonomous moving device according to an embodiment of the present invention includes: a first position acquisition unit 710, configured to acquire, from a first antenna for receiving a satellite signal, first position data of the first antenna, the first antenna being disposed on the autonomous moving device; a second position acquisition unit 720, configured to acquire, from a second antenna for receiving a satellite signal, second position data of the second antenna, the second antenna being disposed on the autonomous moving device, and a predetermined angle existing between a direction of a connecting line of the first antenna and the second antenna and a moving direction of the autonomous moving device; and a direction determining unit 730, configured to determine the moving direction of the autonomous moving device according to the first position data, the second position data, and the predetermined angle.

In an example, in the autonomous moving device 700, the first antenna is disposed on a front part of a body of the autonomous moving device, and the second antenna is disposed on a rear part of the body of the autonomous moving device.

In an example, in the autonomous moving device 700, the first antenna and the second antenna are both disposed on a central axis of the body of the autonomous moving device.

In an example, in the autonomous moving device 700, the position data of the antenna is acquired by a differential satellite positioning system.

In an example, in the autonomous moving device 700, the position data of the antenna is acquired by the differential satellite positioning system and an inertial navigation unit.

In an example, in the autonomous moving device 700, the direction determining unit is configured to determine the moving direction of the autonomous moving device through an angular sensor.

In an example, the autonomous moving device 700 further includes a signal strength determining module, configured to determine whether a signal strength of the satellite signal is less than a predetermined threshold, where the direction determining unit is configured to determine the moving direction of the autonomous moving device through the angular sensor in response to the signal strength of the satellite signal being less than the predetermined threshold.

In an example, in the autonomous moving device 700, the angular sensor includes a compass or a gyroscope.

Herein, a person skilled in the art can understand that, other details of each module in the autonomous moving device in this embodiment are identical with the corresponding details of the method for determining a direction of an autonomous moving device in an embodiment of the present invention stated above, and will not be repeated herein to avoid redundancies.

Likewise, in another aspect, the autonomous moving device according to an embodiment of the present invention includes: a position acquisition unit, configured to acquire, from a first antenna for receiving a satellite signal, position data of the first antenna at a first moment, the first antenna being disposed on the autonomous moving device, where the position acquisition module is further configured to acquire, from the first antenna, another position data of the first antenna at a second moment, the second moment being later than the first moment; and a direction determining module, configured to perform direction fitting based on at least the position data acquired at the first moment and the second moment, so as to determine a moving direction of the autonomous moving device.

In the autonomous moving device, the acquisition frequency of the position data is 1 Hz to 100 Hz.

In the autonomous moving device, the acquisition frequency of the position data is 5 Hz.

In the autonomous moving device, the position data of the antenna is acquired by the satellite positioning system and the inertial navigation unit.

In the autonomous moving device, the direction determining unit is configured to determine a moving direction of the autonomous moving device through the angular sensor.

The autonomous moving device includes a signal strength determining unit, configured to determine whether a signal strength of a satellite signal is less than a predetermined threshold, where the direction determining unit is configured to determine the moving direction of the autonomous moving device through the angular sensor in response to the signal strength of the satellite signal being less than the predetermined threshold.

In the autonomous moving device, the angular sensor includes a compass or a gyroscope.

An embodiment of the present invention further relates to an automatic working system, including the aforementioned autonomous moving device that moves and works in a working area limited by a map.

In the automatic working system, the autonomous moving device is an automatic lawn mower.

In the automatic working system, the automatic working system is an automatic lawn mower.

An embodiment of the present invention further relates to an electronic device, including: a memory, configured to store a computer executable instruction, and a processor, configured to execute the computer executable instruction stored in the memory, so as to perform the method for determining a direction of an autonomous moving device.

An embodiment of the present invention further relates to a computer readable storage medium, storing a computer program instruction, and when the computer program instruction is executed by a computing apparatus, the computing apparatus can be operated to perform the method for determining a direction of the autonomous moving device.

Compared with the prior art, the beneficial effects of this embodiment of the present invention are as follows: A moving direction of the autonomous moving device is determined by using position data, so that the moving direction of the autonomous moving device can be accurately determined. Furthermore, the moving direction of the autonomous moving device is determined by an output of an angular sensor and the position data, and not only an error of the sensor can be corrected by using the position data, but also continuous navigation can be performed when the satellite signal is weak or the positioning signal has low precision.

Exemplary Electronic Device

An electronic device according to an embodiment of the present invention is described with reference to FIG. 21 below. The electronic device may be an electronic device integrated in the mobile station of the autonomous moving device, or a stand-alone device independent of the mobile station. The stand-alone device can communicate with the mobile station, so as to implement a method for determining a direction of an autonomous moving device according to an embodiment of the present invention.

FIG. 21 is a schematic block diagram of an electronic device according to an embodiment of the present invention.

As shown in FIG. 21, the electronic device 600 includes one or more processors 610 and a memory 620.

The processor 610 may be a central processing unit (CPU) or a processing unit in another form with a data processing capability and/or instruction execution capability, and can control other assemblies in the electronic device 600 to perform expected functions.

The memory 620 can include one or more computer program products. The computer program product can include various forms of computer readable storage mediums, for example, a volatile memory and/or a non-volatile memory. The volatile memory may include, for example, a random access memory (RAM) and/or a cache. The non-volatile memory can include, for example, include a read-only memory (ROM), a hard disk, and a flash memory. The computer readable storage medium can store one or more computer program instructions, and the processor 610 can execute the program instruction, so as to implement a method for positioning an autonomous moving device, a fault warning method, and/or other expected functions in each embodiment of the present invention. The computer readable storage medium can further store content such as position data of the antenna and an installation position of the antenna relative to the autonomous moving device.

In an example, the electronic device 600 may further include an input apparatus 630 and an output apparatus 640, and these assemblies are interconnected through a bus system and/or another form of connection mechanism (not shown).

For example, the input apparatus 630 can be configured to receive an input of a user.

The output device 640 can directly output various types of information to the outside or control the mobile station to send a signal.

Certainly, for simplification, FIG. 21 shows only some of the assemblies in the electronic device 600 related to this application, and the assemblies such as a bus and an input/output interface are omitted. Besides, according to a specific application case, the electronic device 600 may further include any other suitable assemblies.

Exemplary computer program product and computer readable storage medium

Besides the method and the device, the embodiments of this application may further provide a computer program product that includes a computer program instruction. When the computer program instruction is operated by the processor, the processor is enabled to perform the steps in the method for determining a direction of an autonomous moving device according to various embodiments of the present invention described in the part "an exemplary method for determining a direction" described in the specification.

The computer program product can edit program code for performing operations in this embodiment of this application by using any combination of one or more programming languages. The programming languages include object-oriented programming languages such as Java and C++, and further include common procedural programming languages, for example, "C" language or a similar programming language. The program code can be executed on a computing device of a user completely, executed on user equipment partially, executed as an independent software package, executed partially on a computing device of a user and partially on a remote computing device, or executed on a remote computing device or a server completely.

Furthermore, the embodiments of this application may further provide a computer readable storage medium that stores a computer program instruction. When the computer program instruction is operated by the processor, the processor is enabled to perform the steps in the method for determining a direction of an autonomous moving device according to various embodiments of the present invention described in the part "an exemplary method for determining a direction" described in the specification.

The computer readable storage medium can use any combination of one or more readable mediums. A readable medium can be a readable signal medium or a readable storage medium. The readable storage medium includes, for example, but is not limited to, electricity, magnet, light, electromagnetism, infrared ray, a system, a device or a unit of a semiconductor, or any combination thereof. More specific examples of the readable storage medium (a non-exhaustive list) include: electric connection with one or more wires, a portable disc, a hard disk, a random access memory (RAM), a read-only memory (ROM), a erasable programmable read-only memory (EPROM or flash memory), an optical fiber, a portable compact disk read-only memory (CD-ROM), an optical storage unit, a magnetic storage unit, or any suitable combination thereof.

It should be understood that, each part of the present invention can be implemented by hardware, software, firmware, or any combination thereof. In the aforementioned implementations, a plurality of steps or methods can be implemented by software or firmware stored in a memory and executed by a suitable instruction execution system. For example, if a step or a method is implemented by hardware, as in another implementation, the step or the method can be implemented by any one of the following technologies that are known in the art or a combination thereof: a discreet logic circuit having a logic gate circuit for implementing a logic function for a data signal, an application specific integrated circuit having a suitable combinational logic gate circuit, a programmable gate array (PGA), a field programmable gate array (FPGA), and the like.

A person of ordinary skill in the art can understand all or some steps of the methods in the embodiments can be implemented by programs instructing relevant hardware, the programs can be stored in a computer readable storage medium, and when the programs are executed, one of the steps of the method embodiment or a combination thereof is included.

Furthermore, each functional unit in each embodiment in the present invention can be integrated in a processing module or exist independently and physically, or two or more units are integrated in one module. The integrated modules can be implemented not only by hardware but also by software functional modules. If an integrated module is implemented in a form of a software functional module and sold and used as an independent product, the integrated module can also be stored in a computer readable storage medium.

The storage medium stated above can be a read-only memory, a magnetic disc, an optical disc, or the like.

Although the specification only describes and depicts some embodiments of the present invention, a person skilled in the art should easily anticipate other means or structures for implementing the functions and/or acquiring structures described herein, and that each change or modification shall be deemed to fall within the scope of the present invention.

What is claimed is:

1. A method for positioning a moving object, wherein comprising:
 determining a reference coordinate of a reference point position;
 acquiring a positioning signal of the moving object at the reference point position, and using the positioning signal as a first reference positioning signal;

acquiring a current positioning signal of a moving object during a moving process, and a reference positioning signal of the moving object before the current positioning signal;

resolving the reference positioning signal and the current positioning signal to acquire error data, the reference positioning signal and the current positioning signal that are resolved having a shared satellite signal; and processing the error data and position information of the reference positioning signal to acquire current position information of the moving object.

2. The method for positioning a moving object according to claim 1, wherein the reference positioning signal is collected and acquired from a satellite by the moving object directly.

3. The method for positioning a moving object according to claim 1, wherein the reference point position is a charging station position or a calibration point having a fixed reference coordinate set in a working area of the moving object.

4. The method for positioning a moving object according to claim 1, wherein a method for acquiring a reference positioning signal comprises:

S1: selecting a latest satellite signal that has been acquired before a current positioning signal as a reference positioning signal;

S2: determining whether the selected reference positioning signal satisfies a resolving condition;

S3: if the selected reference positioning signal satisfies the resolving condition, using the reference positioning signal as a reference positioning signal for a subsequent resolving process; if the selected reference positioning signal does not satisfy the resolving condition, selecting a latest satellite signal before the selected reference positioning signal as a reference positioning signal and repeating step S2;

S4: repeating step S3 till a reference positioning signal that satisfies the resolving condition is acquired.

5. The method for positioning a moving object according to claim 4, wherein the resolving condition is that a quantity of shared satellites reaches a specified threshold of a quantity of resolved satellites.

6. The method for positioning a moving object according to claim 5, wherein the resolving condition is that the quantity of shared satellites reaches the specified threshold of the quantity of resolved satellites, and signal quality of satellite signals reaches a specified signal-to-noise ratio threshold.

7. The method for positioning a moving object according to claim 1, wherein further comprising:

performing error evaluation on the current position information of the moving object acquired through processing; and returning, by the moving object, to a reference point to acquire an initial reference positioning signal again when an error evaluation result satisfies an error condition.

8. The method for positioning a moving object according to claim 7, wherein the error condition is that a working time of the moving object reaches a specified total working time threshold.

9. The method for positioning a moving object according to claim 7, wherein the error condition is that a selected reference positioning signal does not satisfy a resolving condition.

10. The method for positioning a moving object according to claim 1, wherein a working area of the moving object is provided with a plurality of calibration points, the plurality of calibration points has a known fixed reference coordinate, and when the moving object moves to a position of a calibration point, the moving object uses position information of the calibration point as current position information.

11. The method for positioning a moving object according to claim 1, wherein further comprising compensating for the position information, and the compensation method comprises steps of:

determining the position information of the current positioning signal and using the position information as first position information, and determining position information of the reference positioning signal and using the position information as second position information; and compensating for the first position information of the current positioning signal according to the second position information of the reference positioning signal when the first position information of the current positioning signal satisfies a preset condition.

12. The method for positioning a moving object according to claim 11, wherein the preset condition comprises: a first precision value of the current positioning signal is less than a first preset precision threshold.

13. The method for positioning a moving object according to claim 11, wherein the preset condition comprises: a difference between the first position information and the second position information is greater than a preset threshold.

14. The method for positioning a moving object according to claim 11, wherein a quantity of the reference positioning signals is at least two, and the compensating for the first position information of the current positioning signal according to the second position information of the reference positioning signal comprises:

determining moving track information of the moving object according to second position information of at least two reference positioning signals and using the moving track information as first moving track information; and compensating for the first position information of the current positioning signal according to the first moving track information.

15. The method for positioning a moving object according to claim 14, wherein the compensating for the first position information of the current positioning signal according to the first moving track information comprises:

determining a target position of the current positioning signal according to the first moving track information; and adjusting a position corresponding to the first position information of the current positioning signal as the target position directly.

16. The method for positioning a moving object according to claim 14, wherein the compensation method further comprises:

acquiring a second positioning signal collected after the current positioning signal;

determining a second precision value of the second positioning signal, and determining moving track information between the compensated current positioning signal and the second positioning signal and using the moving track information as second moving track information;

performing smooth filtering on the first moving track information and the second moving track information if the second precision value is greater than or equal to a second preset precision threshold; and updating the second moving track information according to the first moving track information if the second precision value is less than the second preset precision threshold.

17. The method for positioning a moving object according to claim 1, further comprising determining a direction of the moving object, wherein a method for determining a direction of the moving object comprises steps of:
- acquiring, from a first antenna for receiving a satellite signal, first position data of the first antenna, the first antenna being disposed on the moving object;
- acquiring, from a second antenna for receiving a satellite signal, second position data of the second antenna, the second antenna being disposed on the moving object, and a predetermined angle existing between a direction of a connecting line of the first antenna and the second antenna and an orientation of the moving object; and
- determining the orientation of the moving object according to the first position data, the second position data, and the predetermined angle.

18. An automatic working system, comprising:
- a moving object, configured to move and work in a limited working area, the moving object configured to:
  - determine a reference coordinate of a reference point position;
  - acquire a positioning signal of the moving object at the reference point position, and using the positioning signal as a first reference positioning signal;
  - acquire a current positioning signal of a moving object during a moving process, and a reference positioning signal of the moving object before the current positioning signal;
  - resolve the reference positioning signal and the current positioning signal to acquire error data, the reference positioning signal and the current positioning signal that are resolved having a shared satellite signal; and
  - process the error data and position information of the reference positioning signal to acquire current position information of the moving object.

19. The automatic working system of claim 18, wherein the moving object further comprises:
- a mobile station or an autonomous moving device provided with the mobile station.

20. A method for positioning a moving object, comprising:
- acquiring a current positioning signal of a moving object during a moving process, and a reference positioning signal of the moving object before the current positioning signal;
- resolving the reference positioning signal and the current positioning signal to acquire error data, the reference positioning signal and the current positioning signal that are resolved having a shared satellite signal;
- processing the error data and position information of the reference positioning signal to acquire current position information of the moving object;
- performing error evaluation on the current position information of the moving object acquired through processing; and
- returning, by the moving object, to a reference point to acquire an initial reference positioning signal again when an error evaluation result satisfies an error condition.

* * * * *